US 9,998,722 B2

(12) United States Patent
Swearingen et al.

(10) Patent No.: US 9,998,722 B2
(45) Date of Patent: Jun. 12, 2018

(54) SYSTEM AND METHOD FOR GUIDED VIDEO CREATION

(71) Applicants: Lee Eugene Swearingen, Mountain View, CA (US); Cathy Teresa Clarke, Mountain View, CA (US)

(72) Inventors: Lee Eugene Swearingen, Mountain View, CA (US); Cathy Teresa Clarke, Mountain View, CA (US)

(73) Assignee: Tapshot, Inc., Mountain View, CA (US)

( * ) Notice: Subject to any disclaimer, the term of this patent is extended or adjusted under 35 U.S.C. 154(b) by 0 days. days.

(21) Appl. No.: 13/801,735

(22) Filed: Mar. 13, 2013

(65) Prior Publication Data
US 2013/0272673 A1 Oct. 17, 2013

Related U.S. Application Data
(60) Provisional application No. 61/610,435, filed on Mar. 13, 2012.

(51) Int. Cl.
H04N 5/77 (2006.01)
H04N 5/93 (2006.01)
G11B 27/00 (2006.01)
H04N 9/79 (2006.01)
G11B 27/034 (2006.01)
G11B 27/34 (2006.01)

(52) U.S. Cl.
CPC ............ H04N 9/79 (2013.01); G11B 27/034 (2013.01); G11B 27/34 (2013.01)

(58) Field of Classification Search
None
See application file for complete search history.

(56) References Cited

U.S. PATENT DOCUMENTS

| 8,244,104 B2 * | 8/2012 | Kashiwa ........................ 386/285 |
| 8,860,865 B2 * | 10/2014 | Dukellis et al. ......... 348/333.02 |
| 2005/0206751 A1 * | 9/2005 | Manico ................ G11B 27/034 348/239 |

(Continued)

OTHER PUBLICATIONS

"iMovie Very Independent Filmmaking", Apple—Apps—Edit HD movies with iMovie, Internet Archive Wayback Machine, http://web.archive.org, Mar. 16, 2011-Apr. 26, 2013, 5 pgs.

(Continued)

Primary Examiner — Heather Jones
(74) Attorney, Agent, or Firm — Womble Bond Dickinson (US) LLP

(57) ABSTRACT

A system and method of guided video creation is described. In an exemplary method, the system guides a user to create a video production based on a set of pre-defined activities. In one embodiment, the system detects a selection of an item in a shotlist. In response to the item selection, the system stores structured metadata about the selection, opens the video camera and displays a dynamic video overlay relevant to the item selection. In addition, the system detects contact with an overlay button in the dynamic video overlay configured to toggle visibility of the dynamic video overlay. The system further receives a command to save a recorded clip of video content, stores additional metadata for the recorded clip of the video content, and updates the respective item in the shotlist.

23 Claims, 16 Drawing Sheets

(56) References Cited

U.S. PATENT DOCUMENTS

| | | | |
|---|---|---|---|
| 2009/0148124 A1* | 6/2009 | Athsani et al. | 386/46 |
| 2012/0237178 A1* | 9/2012 | Ishii et al. | 386/224 |
| 2012/0311448 A1* | 12/2012 | Achour | G06Q 10/101 715/723 |
| 2013/0047081 A1* | 2/2013 | Long | G06F 3/0488 715/705 |
| 2013/0226578 A1* | 8/2013 | Bolton | H04N 21/4758 704/235 |

OTHER PUBLICATIONS

"Slashgear", iMovie 1.3 for iOS Review—SlashGear, http://www.slashgear.com/imovie-1-3-for-ios-review-07217406/, May 9, 2012, 15 pgs.

* cited by examiner ic # SYSTEM AND METHOD FOR GUIDED VIDEO CREATION

CROSS-REFERENCE TO RELATED APPLICATIONS

This application claims the benefit of U.S. Provisional Application Nos. 61/610,435 filed Mar. 13, 2012, which is hereby incorporated by reference.

This invention relates generally to video creation and more particularly to guiding the creation of video content using a portable multifunction device.

BACKGROUND OF THE INVENTION

It is now possible for people to shoot video anytime and anywhere using portable devices such as smartphones. However, in shooting a video production, it can be difficult to know and track all of the shots needed to capture a particular event or activity. The majority of users do not have the professional skills required to tell a good story using video. In addition, the gathering and compiling of video clips typically require transferring data from the portable device to another device or location for editing and rendering, and the entire process can be difficult and time-consuming.

SUMMARY OF THE DESCRIPTION

A system and method of guided video creation is described. In an exemplary method, the system guides a user to create a video production based on a set of pre-defined activities. In one embodiment, the system detects a selection of an item in a shotlist. In response to the item selection, the system stores structured metadata about the selection, opens the video camera and displays a dynamic video overlay relevant to the item selection. In addition, the system detects contact with an overlay button in the dynamic video overlay configured to toggle visibility of the dynamic video overlay. The system further receives a command to save a recorded clip of video content, stores additional metadata for the recorded clip of the video content, and updates the respective item in the shotlist.

In another embodiment, a device retrieves a shotlist for the video content, where the shotlist is a list of a plurality of recommended shots for a type of the video content. Furthermore, the device acquires a plurality of video clips for two or more of the plurality of recommended shots. In addition, the device assembles the video content using the shotlist and the plurality of video clips.

Other methods and apparatuses are described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
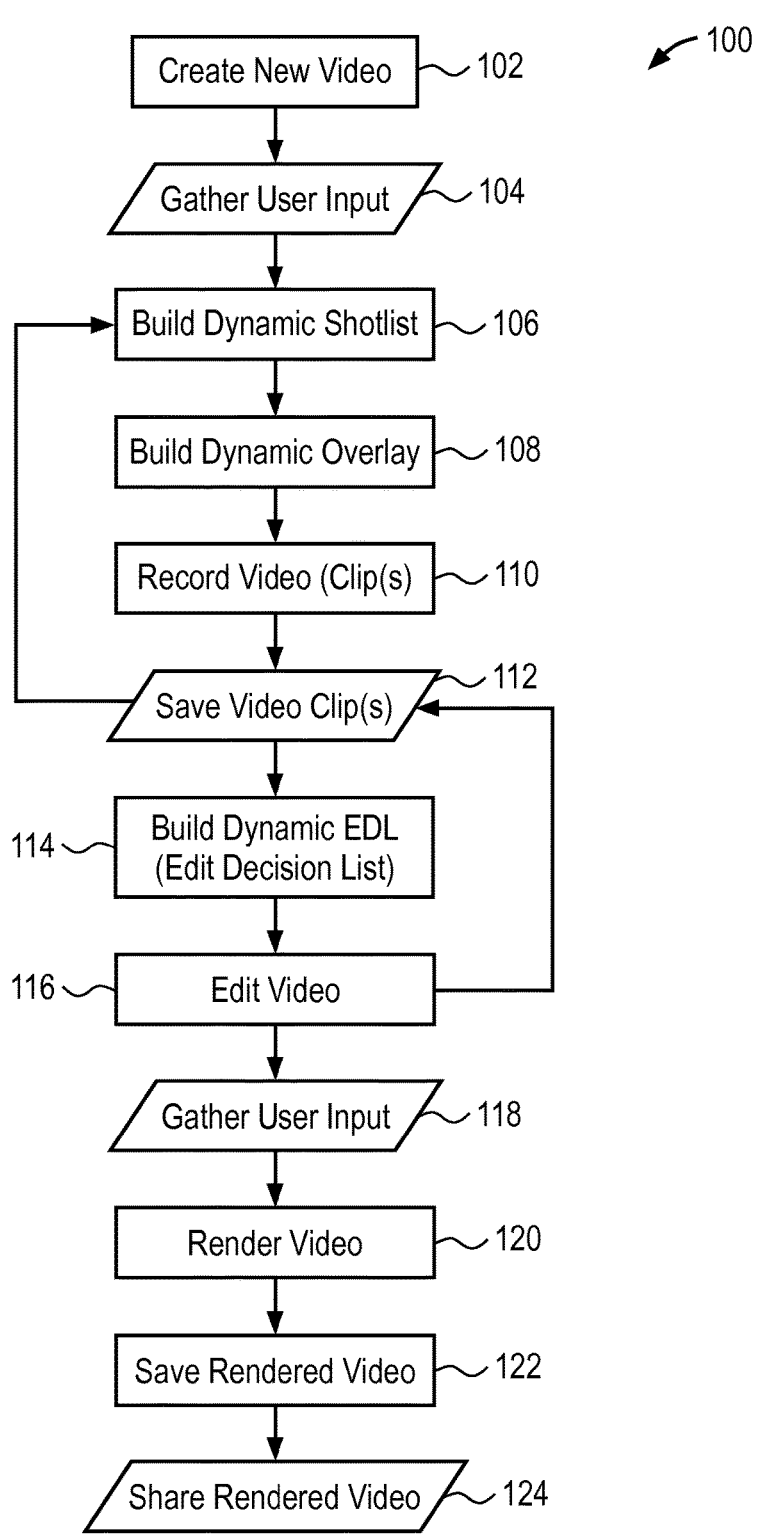
FIG. 1 is a flow diagram of one embodiment of a process to guide the creation of a video production.

A system and method of guided video creation is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The term "host" and the term "portable multifunction device" are intended to refer generally to data processing systems rather than specifically to a particular form factor for the host versus a form factor for the device.

In one embodiment, a portable multifunction device with video support provides a user interface for planning, recording and managing video compilations for a video production. In one embodiment, the guided video content creation reduces difficulties associated with excess footage, organizing multiple video clips, time-consuming editing, and difficult decisions related to scripting, composing, and choosing appropriate music and graphics. By automating video creation and by guiding the user through the process from start to finish, the system makes it easy to shoot, edit, render and share professional quality video productions in order to communicate moments of our daily lives with one another using a portable device.

In one embodiment, a portable multifunction device that includes a touch-sensitive screen is used. However, it should be noted that the user interfaces and associated processes may be applied to other devices, such as video cameras, that may include one or more other user interface input devices, such as a mouse, a stylus, a click wheel, microphone for voice command, etc. While in one embodiment, the portable multifunction device is a smartphone that includes a built-in video camera, in alternate embodiment the portable multifunction device is a different type of device (e.g., portable media player, laptop, tablet, personal computer, personal digital assistant, gaming device, etc. that has an integrated camera and/or is tethered or otherwise coupled to a camera).

In one embodiment, the guided video creation is a system in a device that guides a user into acquiring and assembling a video production that is composed of a set of pre-defined activities. In one embodiment, the portable multifunction device includes a camera to acquire one or more video clips corresponding to the set of pre-defined activities and a processing unit to assemble the one or more video clips into the video production. In another embodiment, the portable multifunction device is coupled to another device that is used to acquire the one or more video clips corresponding to the set of pre-defined activities. In this embodiment, the portable multifunction device includes the processing unit to assemble the one or more video clips into the video production.

In one embodiment, the video clips to be acquired are related to a set of pre-defined activities. The set of pre-defined activities is a set of one or more activities that relate to the type of video production to be created. For example and in one embodiment, the video clips to be acquired are related to a particular event, such as following a single person during a baseball game, or generating a video for someone's birthday. In this example and embodiment, the event will have a set of pre-defined activities, in which the user may wish to acquire video clips for some or all of the pre-defined activities. As an example, for a birthday party, the pre-defined activities could be: interview with birthday person, guest interviews about the birthday person, birthday song and cake, etc. As another example, for acquiring video clips following a person in a baseball game (e.g., a child in a Little League game, etc.), the pre-defined activities could be pregame interview, the person hitting, the person fielding, the person running the base paths, etc.

As another example and in another embodiment, the video can be related to a cataloging video, in which the pre-defined set of activities relate to a similar type of video clip. For example and in one embodiment, the cataloging video could be related to cataloging one or more jokes, in which each of the pre-defined activities is recording the same or different joke. As another example, the pre-defined set of activities for acquiring video clips to catalog a recipe could be: setup, ingredients, step 1, step 2, finished dish, interview with the chef.

In one embodiment, the guided video creation presents a shotlist to the user on the portable multifunction device that is used by the user to acquire the one or more video clips. In one embodiment, the shotlist is a data structure used to guide the video content creation and includes a dynamic list of items. In one embodiment, the shotlist can assist in guiding the creation of an edited video production for a specific event or activity. In addition, the shotlist supports recording of multiple video clips per shot and these recorded clips may be viewed by the user. Furthermore, the shots in the shotlist can include tips/scripts for recording (displayed in overlay described below). The shotlists may be created by the system based on the type of video to be created by the user (e.g., birthday, baseball game, joke collection, etc.) or may be created/configured by the user.

In one embodiment, the dynamic list of items includes a suggested camera shot (e.g., shot medium (video, audio, and/or photo, etc.), shot type (close-up, medium, wide, single, group, etc.), etc.) for the user to record corresponding to one of the set of pre-defined activates and metadata about the list item itself (e.g., including label, thumbnail, number of clips, assigned section). In one embodiment, the shotlist is presented in a shotlist user interface that is displayed in a shotlist user interface. The shotlist user interface is described further in FIG. 6 below.

In this embodiment, the shotlist user interface guides the user to acquire video for some or all of the pre-defined activities. In one embodiment, by activation of one of the camera shots for a corresponding one of the set of pre-defined activities, the user is prompted in a mode (e.g., a live camera mode) to acquire shot. In this embodiment, the mode includes an overlay that can give cues to the user for acquiring the shot. In one embodiment, the overlay is displayed during the preview and/or recording of the shot and can guide the user through the shot acquisition process with contextual tips and/or instructions for that particular shot. The cues can be textual, an illustration, animation, audio, video, etc., and/or a combination thereof. In one embodiment, the cues are general (e.g., hold the device steady, etc.) and/or can be specific to the particular type of activity that is being recorded. For example and in one embodiment, if the activity being recorded is a personal interview for a birthday event, the cues may include reminders on the length of the shot (e.g., "keep it short," "getting lengthy," "wrap it up", etc.).

In one embodiment, the cues can be dynamic and change during the video recording process. For example and in one embodiment, the cues can change as the length of the video clip recording increases (e.g., cue changes from "keep it short" to "getting lengthy" and to "wrap it up" as the video clip recording length increases). In addition, the video cues can include questions or notes the user can use while making the recording. For example and in one embodiment, for the "opening question" section of a birthday video type, sample questions could be "Are you excited about your birthday?" and "What are you doing for your birthday?". In addition, the cues can help plan the video clip recording. For the birthday example above, the cues indicate when to take the video clip (e.g., "interview the person before or at the beginning of the birthday event") and/or the location for the clip (e.g., "shoot in a setting where the person feels comfortable and is willing to talk freely").

As another example and in another embodiment, for the "hitting" section of a baseball game video type, the cues could remind the user to "start recording during the pitcher's windup," "if the pitch is a ball, tap Retake to be ready for the next pitch," and to "get close and shoot through the fence." The overlay is further described in FIG. 7 below.

The edit decision list is a data structure that provides instructions to the rendering engine to assemble the video production. In one embodiment, the edit decision list can include shotlist metadata to determine which section a clip is in and order and arrangement of the clip within a section, rules to defined order and arrangement of clips (e.g., section clip can be order chronologically, algorithmically, etc.), section rules for video production structure (e.g., montage, linear, play in slow motion, play backwards, play with filters, play in certain order, insert audio or video only from clips, play with title graphics, apply transition effect, etc.). A user can change the metadata for the shotlist through an edit shotlist user interface. For example and in one embodiment, a user could change the order of the sections, order of the clips within each section, moving a clip to another section, change a section rule for the video production structure, etc. The edit decision list user interface is further described in FIG. 8 below.

In one embodiment, the rendering engine uses the instruction from the edit decision list to compile the video production. Prior to rendering the video production, a user has the option to edit the render settings (e.g., choose new music, turn music on/off, turn graphics on/off, add titles, etc.), include/not include clips for shorter/longer versions of the rendered video production, and trim individual clips.

Figure 5:
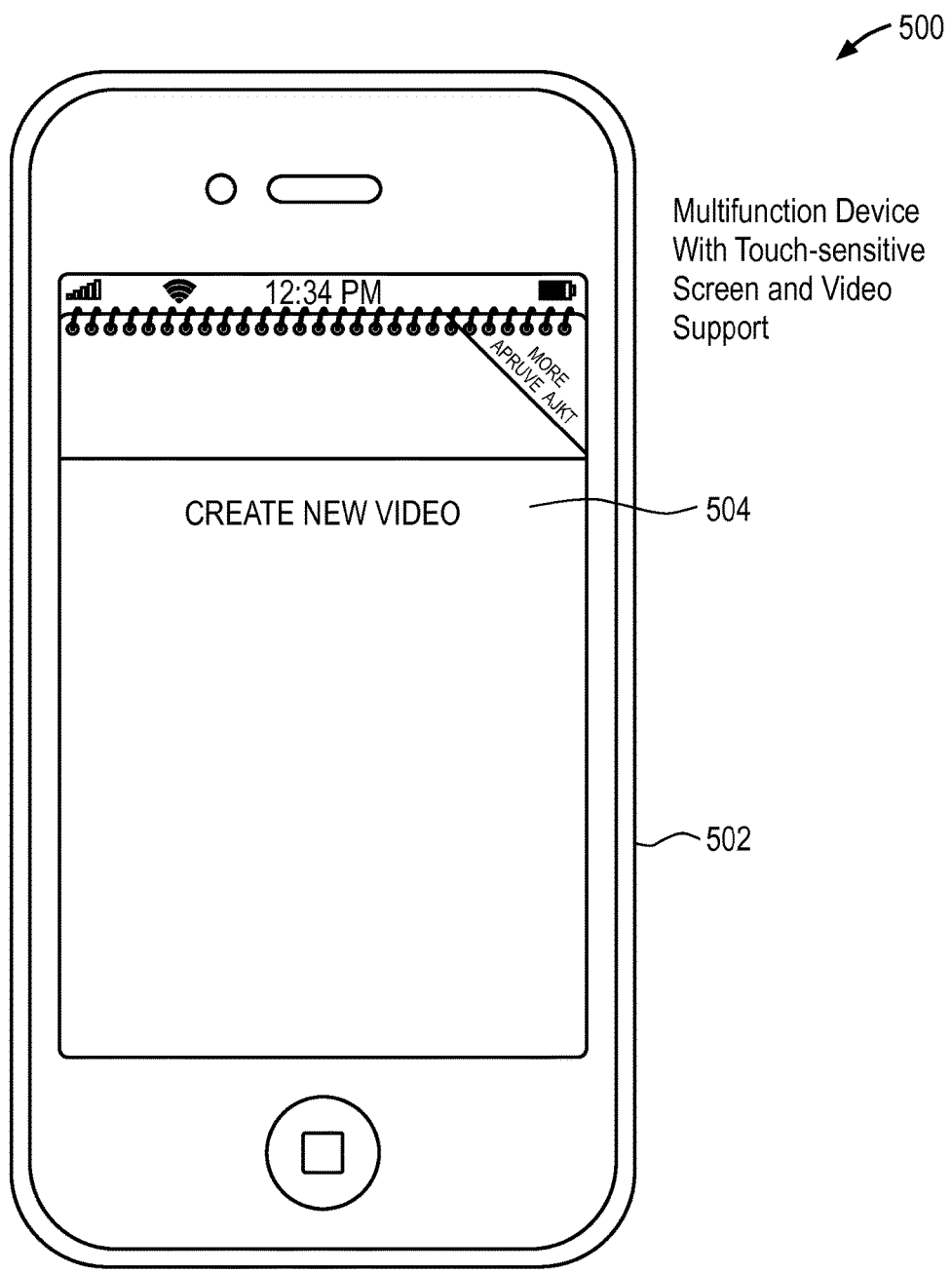
FIG. 5 is a block diagram of one embodiment of a portable multifunction device with a touch-sensitive display.

FIG. 1 is a flow diagram of one embodiment of a process 100 to guide the creation of video production. In FIG. 1, process 100 begins by receiving an indication that a new video production is to be created. In one embodiment, process 100 receives the indication as result of a user tapping on a "Create New Video" button. For example and in one embodiment, the create new video button is a button as shown in FIG. 5 below. At block 102, process 100 gathers the user input regarding the type of video production to be created. In one embodiment, process 100 gathers user input about the video production that is entered from the user and/or is the determined from the type of video production that is to be created. In one embodiment, the type of video production is the type of the set of pre-defined activities that are the subject of the video productions. For example and in one embodiment, if the type of video production is a birthday party, the user input that is gathered could be the name of the birthday person, their age, etc.

At block 106, process 100 builds a dynamic shotlist. In one embodiment, the shotlist is a list of recommended shots, which guides the user in the planning and recording of a video production for a specific event or activity. In one embodiment, process 100 builds the dynamic shotlist from the gathered user input and default metadata for the type of video production to be created. For example and in one embodiment, if the type of video production is a birthday party, the default data for a shotlist is a list of recommended shots for the birthday party, such as introduction shot, personal interview about the birthday person, lighting of the birthday cake, etc. In addition, the default shotlist data may include other metadata for the dynamic shotlist (e.g., shot labels, icons, camera settings, rendering instructions, audio clips to use, etc. Furthermore, process 100 integrates the user input data with the shotlist default data to generate the dynamic shotlist. For example and in one embodiment, for the birthday party example above, the user may enter the name and age of birthday person.

At block 108, process 100 builds the dynamic overlay. As described above the dynamic overlay is an overlay that can give cues to the user for acquiring the shot. In one embodiment, the overlay is displayed during the preview and/or recording of the shot and can guide the user through the shot acquisition process with contextual tips and/or instructions for that particular shot. The cues can be in the textual, an illustration, animation, audio, video, etc., and/or a combination thereof). In one embodiment, the cues are general (e.g., hold the device steady, etc.) and/or can be specific to the particularly type of activity that is being recorded. In one embodiment, the cues are retrieved from the shotlist metadata. For example and in one embodiment, if the activity being recorded is personal interview for a birthday event, the cues may include reminders on the length of the shot (e.g., "keep it short," "getting lengthy," "wrap it up", etc.). In addition, the cues can be dynamic and change during the video recording process. The overlay is further described in FIG. 10 below.

Process 100 records the one or more video clips for each of the different shots at block 110. In one embodiment, process 100 records the video clips by the user selecting a shot in the shotlist, process 100 configuring the portable multifunction device into live camera mode, the user recording the video. In one embodiment, process 100 records a video clip for some or all of the shots in the shotlist. In another embodiment, process 100 records more than one video clip for a particular shot. For example and in one embodiment, using the birthday party above, process 100 records a single video clip for the introduction clip, multiple interview video clips, a video clip for the birthday cake lighting, but no video clip for the panning of the birthday setting. At block 112, process 100 saves the recorded video clips. In one embodiment, process repeats blocks 110 and 112 for the number of video clips that are recorded.

At block 114, process 100 builds a dynamic edit decision list. In one embodiment, the edit decision list is a data structure that provides instructions to the rendering engine to assemble the video production. In one embodiment, the edit decision list can include shotlist metadata to determine which section a clip is in, the order and arrangement of the clip within a section, rules to defined order and arrangement of clips (e.g., section clip can be order chronologically, algorithmically, etc.), section rules for video production structure (e.g., montage, linear, play in slow motion, play backwards, play with filters, play in certain order, insert audio or video only from clips, play with title graphics, apply transition effect, etc.).

In one embodiment, process 100 builds the dynamic edit decision list by using shotlist metadata for each video clip to determine which section the clip is in (e.g., intro, middle, end section). In addition, process 100 uses the shotlist metadata for each video clip to determine the order and arrangement of each clip within each section (e.g. order based on shot type, or creation date and time for chronological display). Process 100 can further apply rules by section to define order and arrangement of clips within each section (i.e. one section is ordered chronologically or reverse chronologically, another section cycles algorithmically, using facial recognition to group the video clips, etc.). Additionally, process 100 applies rules by section based on final video structure (e.g. montage, linear, play in slow motion, play backwards, play with filters, play in certain order, insert audio or video only from clips, play with title graphics, apply transition effect, etc.).

Process 100 edits some, none, or all of the video clips at block 116. In one embodiment, process 100 edits the video clips by trimming the video clips, changing associated audio, applying processing instructions (convert to black & white, etc.), etc. In one embodiment, process 100 saves the edited video clips at block 116. In one embodiment, process 100 repeats blocks 112, 114, and 116 for each of the acquired video clips.

At block 118, process 100 gathers the user input regarding the acquired video clips. In one embodiment, process 100 gathers the user input via an edit decision list user interface. In this embodiment, the edit decision list user interface allows the user to override default and allows grouping of shots in a variety of different ways (by section, i.e. a grouping of shots (e.g. render all baseball pitching clips), by chronology, based on clip creation date (or reverse-chronologically), algorithmically (e.g. render as a montage using facial recognition to sequence clips by person(s) in clips), etc.). Furthermore, clips may be rearranged between sections, clips and/or sections may be left out of the resulting video production, etc. The edit decision list user interface is further described in FIG. 11 below.

Process 100 renders the video production at block 120. In one embodiment, process 100 renders the video production by using the shotlist and edit decision list metadata. For example and in one embodiment, process 100 renders the video production by assembling the video clips in the designated order based on the section order and clip order within each section, applying the designated audio, video effects (e.g., transitions between clips, adding graphics, etc.), and/or other video effects. In one embodiment, the rendered video production is a video that is composed of some and/or all of the video clips. Process 100 saves the video production at block 122. In one embodiment, process 100 saves the rendered video locally on the portable multifunction device. At block 124, process 100 shares the rendered video.

Figure 2:
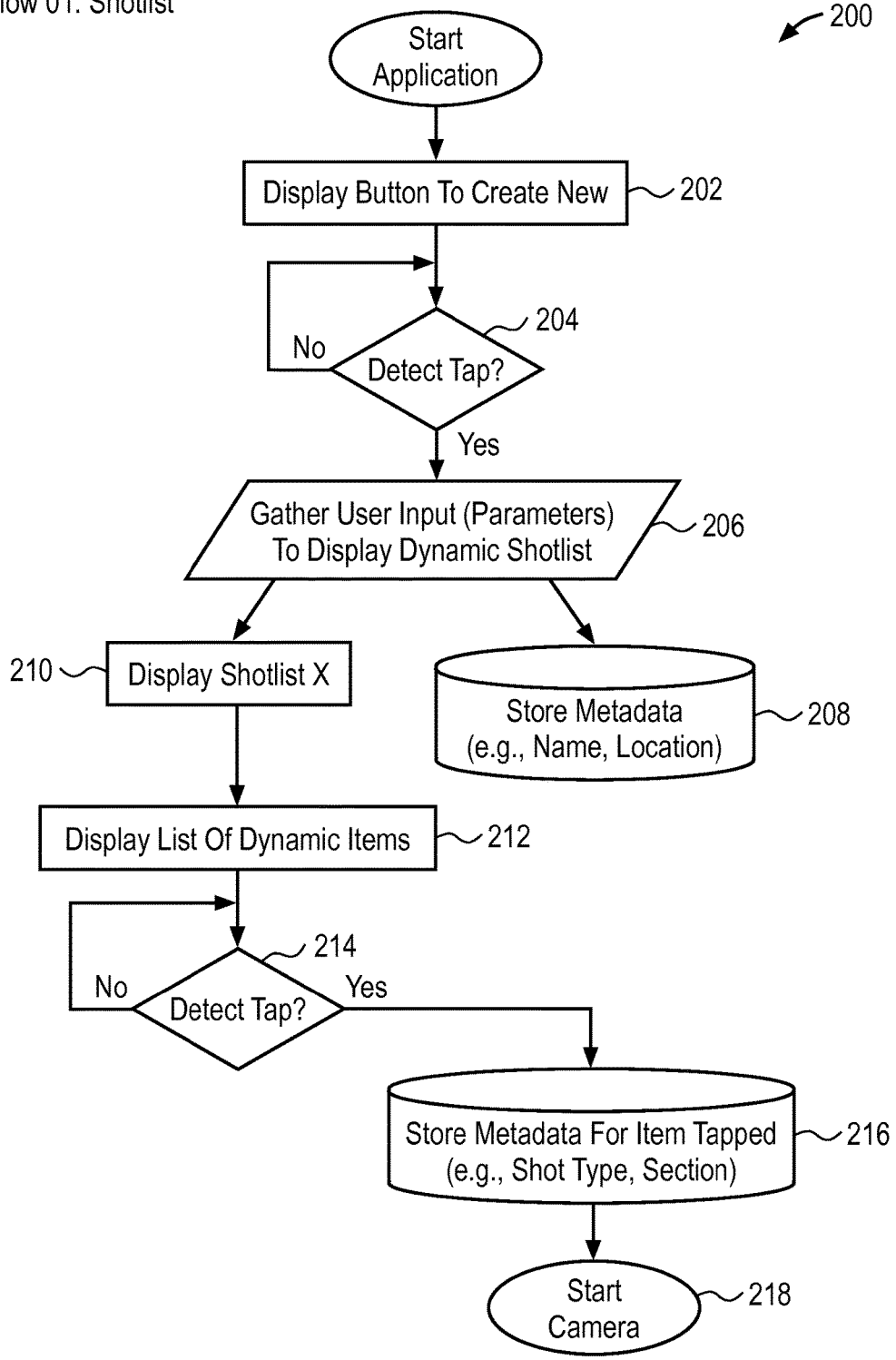
FIG. 2 is a flow diagram of one embodiment of a process to acquire video content using a dynamic shotlist.

FIG. 2 is a flow diagram of one embodiment of a process 200 to acquire video content using a dynamic shotlist. In one embodiment, process 100 performs process 200 at block 106 of FIG. 1 above. In FIG. 2, process 200 begins by displaying a button to create a new video project. In one embodiment, a video project is the project to create a video presentation from a shotlist and a set of media content used to create the video presentation. While in one embodiment, the media content is one or more video clips, in the alternate embodiments, the media content can also include an image, text, audio, other video clips, and/or combination thereof. In one embodiment, process 200 displays the new button in response to an indication that a new video project is to be created. While in one embodiment, process 200 detects a tap to receive an indication from the user, in alternate embodiments process 200 can receive an indication from the user via other means (e.g., from a mouse, a stylus, a click wheel, keyboard, detected motion, voice, etc.). Furthermore, in one embodiment, the new video project will have a default type. In one embodiment, the type of the video project can be related to an event, cataloging, etc.

If process 200 detects a tap, at block 206, process 200 gathers the user input for the video project. In one embodiment, the user input for the video project can include the name of the subject and location of the video project. In an alternate embodiment, the user input can be specialized to the type of video project of the user wishes to create. For example and in one embodiment for a birthday party, the user input can include the age of the person who is having a birthday. As another example and in another embodiment, for video project following a person in a baseball game, the user input can include the baseball team name, team colors, and/or the opposing team. At block 208, process 200 stores the user input as metadata (e.g., name, location etc.).

At block 210, process 200 displays the shotlist with a user interface. In one embodiment, process 200 displays the shotlist as a group of sections that are used to compile the video project and generate resulting video presentation. In one embodiment, a section is a group of media clips such as video clips that relate to a specific activity of one of the set of pre-defined activities for that video project. For example and in one embodiment, a section can be the lighting of the birthday cake for any birthday party video project.

Process 200 displays a list of the dynamic items for that shotlist at block 212. In one embodiment, the dynamic items are items that are created based on the user input and the type of video project that the user wishes to create. At block 214, process 200 detects a tap to start recording a video clip for the video project. If there is no tap at block 214, process 200 waits at block 214 for another tap. If there is a tap, at block 216, process 200 stores the metadata for the item tapped. In one embodiment, this stored metadata can be the shot type location, section designation, etc. At block 218, process 200 starts the camera so that a video recording can be acquired. In one embodiment, process 200 puts the portable multifunction device into a live camera mode.

Figure 3:
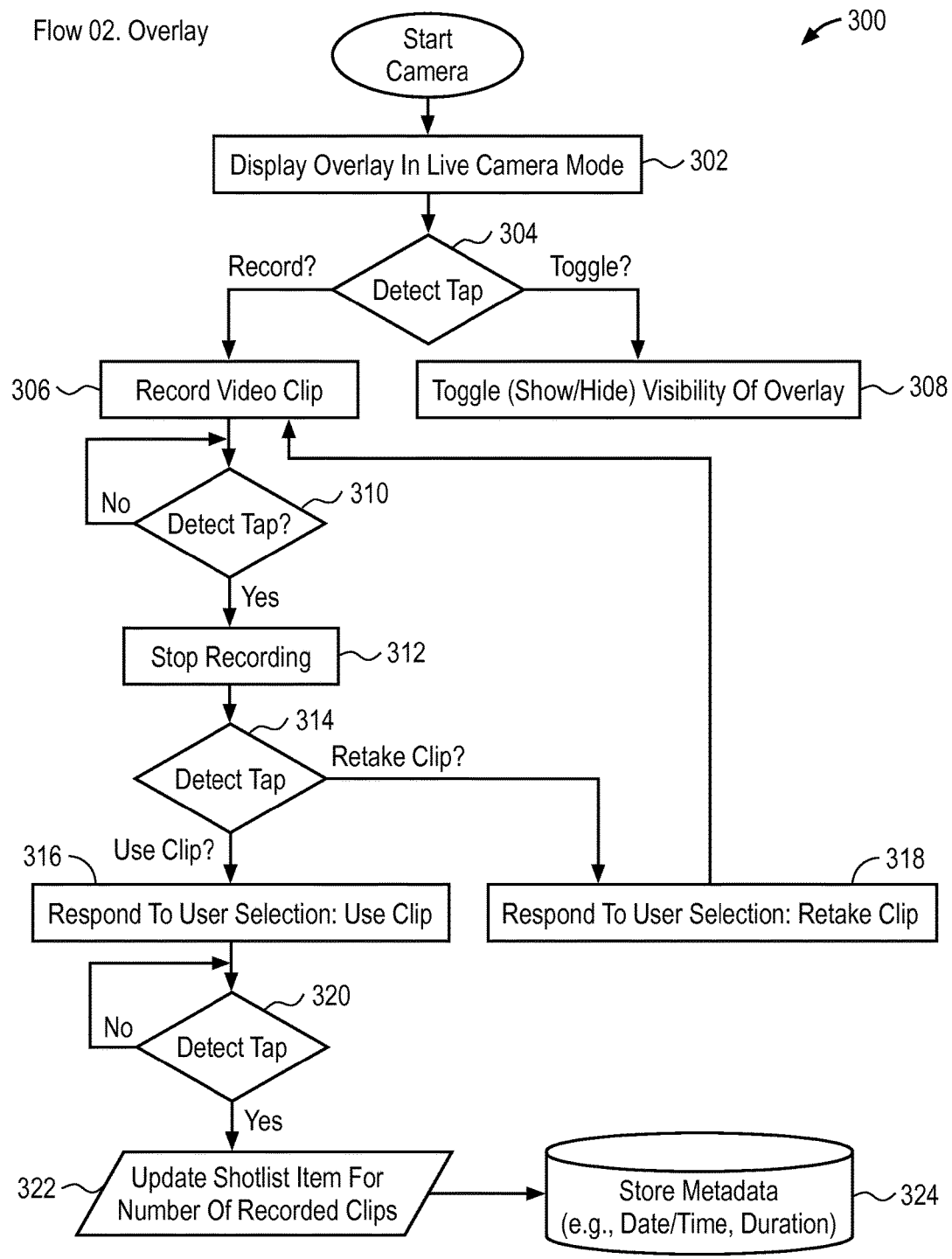
FIG. 3 is a flow diagram of one embodiment of a process to acquire video content for a video clip using a dynamic overlay.

FIG. 3 is a flow diagram of one embodiment of a process to acquire video content for a video clip using a dynamic overlay. In one embodiment, process 300 is performed by process 100 in FIG. 1 at blocks 108 and 110. In FIG. 3, process 300 begins by displaying an overlay in live camera mode at block 302. In one embodiment, an overlay gives cues to the user for acquiring the shot. In one embodiment, the overlay is displayed during the preview and/or recording of the shot and can guide the user through the shot acquisition process with contextual tips and/or instructions for that particular shot. The cues can be textual, an illustration, animation, audio, video, etc., and/or a combination thereof. In one embodiment, the cues are general (e.g., hold the device steady, etc.) and/or can be specific to the particularly type of activity that is being recorded. For example and in one embodiment, if the activity being recorded is personal interview for a birthday event, the cues may include reminders on the length of the shot (e.g., "keep it short," "getting lengthy," "wrap it up", etc.). In one embodiment, the cues can be dynamic and change during the recording process.

In one embodiment, live camera mode is when the integrated or tethered camera activated and a preview of the camera scene is viewable using the portable multifunction device. At block 304, process 300 detects a tap to the user interface to the portable multifunction device in live camera mode. In one embodiment, process 300, determines if the tap is to record a video clip or to toggle the visibility of the overlay. If the tap is to toggle visibility of the overlay, process 308 toggles the visibility of the overlay. For example and one embodiment, if the overlay is visible, process 300 detects toggle the visibility of the overlay and process 300 hides the overlay. Alternatively, if the overlay is hidden and block 300 detects a tap to toggle the overlay visibility, process 300 shows the overlay.

If the tap is to record a video clip, at block 306, process 300 starts recording a video clip. In one embodiment, process 300 acquires the video clip during the video recording time. At block 310, process 300 determines if process 300 detects a tap. If there is not a tap, process 300 waits to detect the next tap at block 310. If process 300 detects a tap, at block 312, process 300 stops recording of the video clip. At block 314, process 300 detects another tap. In one embodiment, process 300 determines if the tap is to respond to user selection to use a clip or to retake a clip. If the detected tap is to retake the clip, at block 318, process 300 retakes the clip by proceeding to block 306. If the tap is to use a clip, at block 316, process 300 uses the video clip, saves that clip, and associates the clip with the shotlist to be used for the video project.

At block 320, process 300 detects another tap and process 300 updates the shotlist item for the number of recorded clips at block 322. In one embodiment, process 300 uses the clip recorded at 316 and updates the shotlist for that clip. At block 324, process 300 stores the metadata associated with the new clip as well as other metadata (e.g., date, time duration, etc.).

Figure 4:
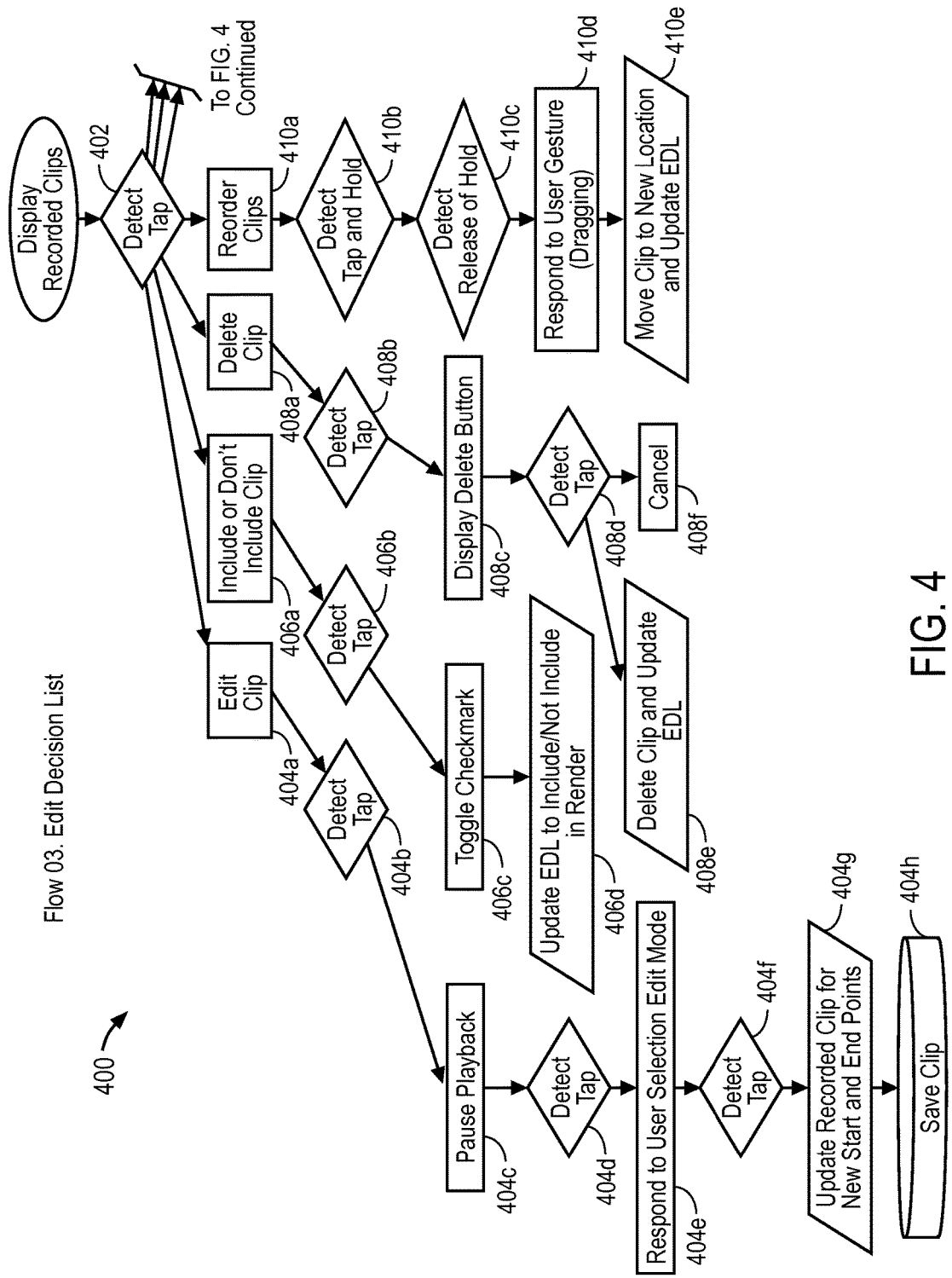
FIG. 4 is a flow diagram of one embodiment of a process to edit the list of shots used to create the video content.
Figure 4:
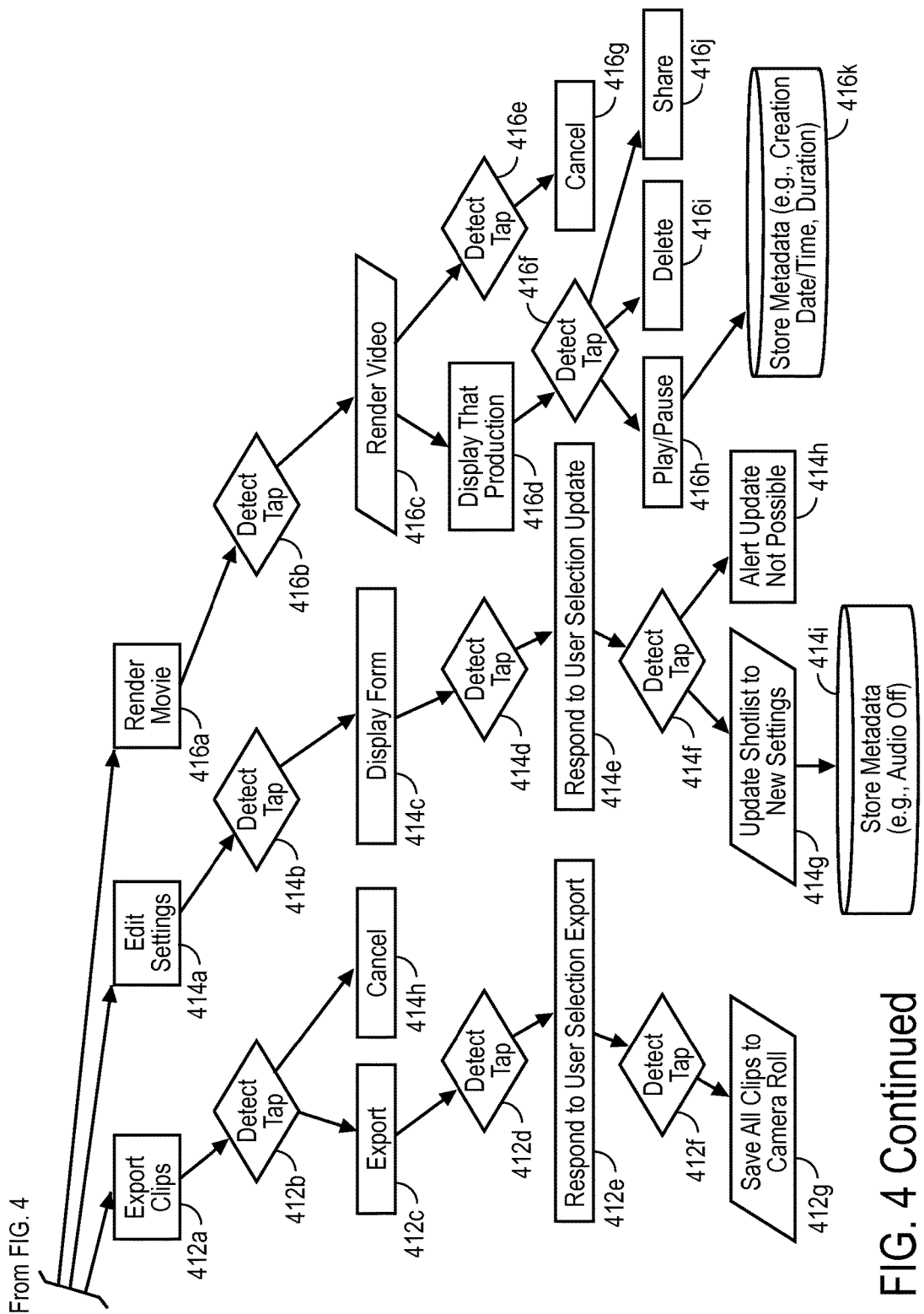

FIG. 4 is a flow diagram of one embodiment of a process 400 to edit the list of shots used to create the video content. In one embodiment, process 400 is performed by process 100 at block 114 of FIG. 1 above. In FIG. 4, process 400 begins by detecting a tap within the user interface that is displaying the recorded clips. In one embodiment, by displaying the recorded clips, process 400 allows for input from the user to change the shotlist and the final video production. At block 402, process 400 detects a tap to change the shotlist and/or video production. In one embodiment, process 400 allows the user to edit one or more of the video clips, include/not include a video clip in the video production, delete a clip, reorder clips, export clips, edit settings, and render a video production. If the detected tap is to edit one or more of the video clips, execution proceeds to blocks 404a-h. If the detected tap is to include/not include a video clip in the video production, execution proceeds to blocks 406a-d. If the detected tap is to delete a clip, execution proceeds to blocks 408a-f. If the detected tap is to reorder clips, execution proceeds to blocks 410a-e. If the detected tap is to export clips, execution proceeds to blocks 412a-g. If the detected tap is to edit settings, execution proceeds to blocks 414a-i. If the detected tap is to render a video production, execution proceeds to blocks 416a-k.

In one embodiment, at blocks 404a-h, process 400 allows for editing of one or more video clips. Process 400 enters edit video clip mode at block 404a. At block 404b, process 400 detects a tap. If the tap is not a recognized command for this mode, process 400 waits for another tap at block 404b. If the detected tap is to pause playback, process 400 pauses playback at block 404c. At block 404d, process 400 detects a tap. If the tap is not a recognized command for this mode, process 400 waits for another tap at block 404d. If the detected tap was to enter edit mode, process 400 enters the edit mode for that video clip at block 404e. In one embodiment, process 400 receives the edited parameters for that video clip. For example and in one embodiment, the start and end points parameters can be edited as with other parameters for the video clip (e.g., default audio track, sound effects, rendering instructions, etc.).

At block 404f, process 400 detects a tap. If the tap is not a recognized command for this mode, process 400 waits for another tap at block 404f. If the detected tap was to update the edited video clip, process 400 updates the edited video clip at block 404e. In one embodiment, process 400 updated the edited video clip with the edited parameters (e.g., updating the updated start and end points for the edit video clip, etc.). Process 400 saves the edited video clip at block 404h.

In one embodiment, at blocks 406a-d, process 400 allows for editing of one or more video clips. Process 400 enters include/not include video clip mode at block 406a. At block 406b, process 400 detects a tap. If the tap is not a recognized command for this mode, process 400 waits for another tap at block 406b. If the detected tap is to toggle the checkmark as to whether to include/not include a particular video clip, process 400 toggles the include/not include status of that video clip at block 406c. Process 400 updates the edit decision list to include/not include the video clip in the video production at block 406d.

In one embodiment, at blocks 408a-f, process 400 allows for deleting of one or more video clips. Process 400 enters delete video clip mode at block 408a. At block 408b, process 400 detects a tap. If the tap is not a recognized command for this mode, process 400 waits for another tap at block 410b. If the detected tap is to delete a video clip, at block 408c, process 400 displays a delete button for the video clip. In one embodiment, the delete button is a delete confirmation button that allows the user to confirm deletion of the video clip. At block 408d, process 400 detects a tap. If the tap is not a recognized command for this mode, process 400 waits for another tap at block 408d. If the detected tap is confirmation to delete a video clip, at block 408e, process 400 deletes the video clip and updates the edit decision list. If the detected tap is to cancel the deletion a video clip, at block 408f, process 400 does not deletes the video clip.

In one embodiment, at blocks 410a-e, process 400 allows for reordering of one or more video clips. Process 400 enters reorder video clip mode at block 410a. At block 410b, process 400 detects a tap. If the tap is not a recognized command for this mode, process 400 waits for another tap at block 410b. If the detected tap is a tap and hold of a video clip, process 400 proceeds to block 410c. At block 410c, process 400 detects the release of the tap and hold. Process 400 responds to the user gesture of dragging the selected video clip by updating the ordering and location of the video clip in the user interface at block 410d. At block 410e, process 400 moves the video clip to the new location and updates the edit decision list.

In one embodiment, at blocks 412a-h, process 400 allows for exporting of one or more video clips. Process 400 enters export video clip mode at block 412a. At block 412b, process 400 detects a tap. If the tap is not a recognized command for this mode, process 400 waits for another tap at block 412b. If the detected tap is a command to cancel the exportation of the video clip, process 400 cancels the exportation at block 412h. If the detected tap is a command to export the video clip, at block 412d, process 400 detects another tap. If the detected tap is not a recognized command for this mode, process 400 waits for another tap at block 412d. If the detected tap is a command to export the clip, process 400 exports the video clip by presenting a user interface dialog prompting the user to indicate where the video clip should be exported at block 412e. For example and in one embodiment, the user could export the video clip to the default location (e.g., the camera roll location on the portable multifunction device). At block 412f, process 400 detects a tap. If the tap is not a recognized command for this mode, process 400 waits for another tap at block 412f. If the detected tap is a command to export the video clip to the selected location, process 400 exports the video clip to the selected location at block 412g.

In one embodiment, at blocks 414a-i, process 400 allows for editing of one or more settings. Process 400 enters settings edit mode at block 414a. At block 414b, process 400 detects a tap. If the tap is not a recognized command for this mode, process 400 waits for another tap at block 414b. If the detected tap is for a command to display the settings, process 400 displays the edit decision list settings at block 414c. At block 414d, process 400 detects a tap. If the tap is not a recognized command for this mode, process 400 waits for another tap at block 414d. If the detected tap is a user selection of one or more of the settings, process 400 presents the user with a user interface to edit the one or more settings at block 414e.

At block 414f, process 400 detects a tap. If the tap is not a recognized command for this mode, process 400 waits for another tap at block 414f. If the detected tap is an update to the one or more of the settings, process 400 receives the update of the one or more settings at block 414e and stores the metadata associated with the update at block 414i. If the tap corresponds to an update that is not allowed, at block 414h, process 400 alerts the user that the attempted update is not allowed and does not update the edit decision list.

In one embodiment, at blocks 416*a-k*, process 400 allows for rendering of the one or more video clips and edit decision list into a video production. Process 400 enters the render video production mode at block 416*a*. At block 416*b*, process 400 detects a tap. If the tap is not a recognized command for this mode, process 400 waits for another tap at block 416*b*. If the detected tap is to render the video, process 400 renders the video at block 416*c*. In one embodiment, rendering the video assembles and processes the video clips and other media content into a video production using the edit decision list metadata. At block 416*d*, process 400 displays the video production. In one embodiment, process 400 displays the rendered video production on the portable multifunction device and presents a user interface that allows the user to review the rendered video production.

At block 416*f*, process 400 detects a tap. If the tap is not a recognized command for this mode, process 400 waits for another tap at block 416*f*. If the detected tap is to play/pause the rendered video production, process 400 plays or pauses the rendered video production at block 416*h*. Process 400 stores the metadata for the rendered video production (e.g., creation data/time, duration, etc.) at block 416*k*. If the detected tap is to delete the rendered video production, process 400 deletes the rendered video production at block 416*i*. In one embodiment, process 400 deletes the rendered video production and updates the metadata to indicate that the rendered video production has been deleted. If the detected tap is to share the rendered video production, process 400 shares the rendered video production at block 416*j*. In one embodiment, process 400 can share the rendered video production locally (e.g., to other application on the portable multifunction device) or remotely (e.g., on one or more social networks, media sharing sites, website, etc.).

As described above, the process 100 for guiding the creation of a video production can be performed on a portable multifunction device. FIG. 5 is a block diagram of one embodiment of a portable multifunction device 500 with a touch-sensitive display. In FIG. 5, portable multifunction device 500 includes a display 502 that is used to display a create new video button 504. In one embodiment, the create new video button 504 is displayed a results of a user activating a program that is used to guide the creation of video production. In one embodiment, the program can be a general-purpose video production program or a program for creating a specific video production (e.g., birthday party, baseball game, etc.). In one embodiment, the activation of the create new video button 504 leads to the creation of a dynamic shotlist as described in FIG. 2 above.

Figure 6:
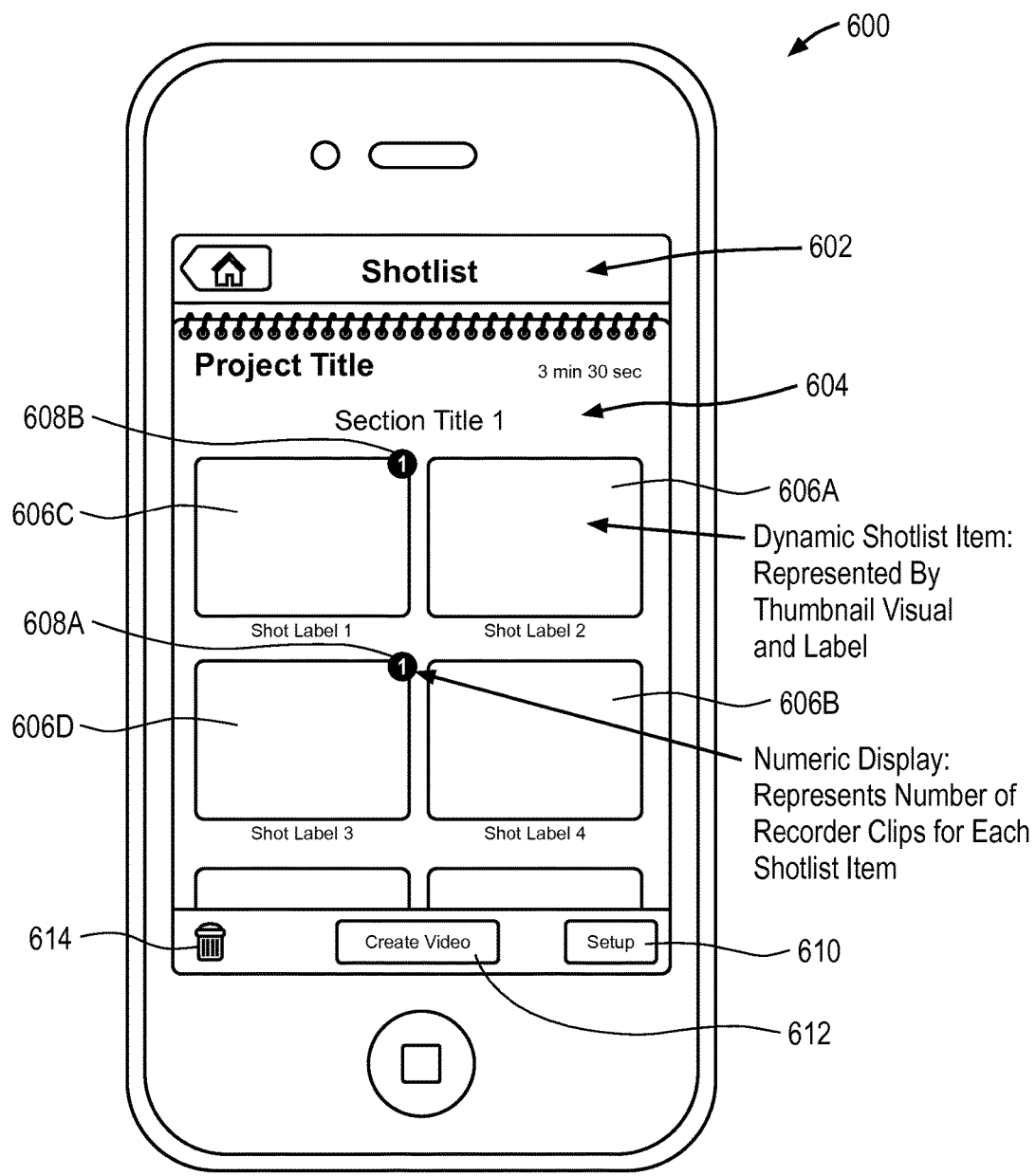
FIG. 6 is a block diagram of one embodiment of a user interface for displaying and managing a shotlist.

FIG. 6 is a block diagram of one embodiment of a user interface 602 for displaying and managing a dynamic shotlist. In FIG. 6, the portable multifunction device 600 includes a dynamic shotlist display 602. In one embodiment, the dynamic shotlist display 602 includes shotlist user interface 604, a set of shotlist items 606A-D, number of shots icon 608A-B, a setup button 610, create video button 612, and trash icon 614. In one embodiment, the shotlist user interface 604 includes a project title, a section title, and a time elapsed label that indicates the length of the shots in this section. In one embodiment, the set of shotlist items 606A-D corresponds to the set of pre-defined activities that comprise the video production. In another embodiment, the set of shotlist items 606A-D can also include other media content that does not correspond to the set of pre-defined activities. In one embodiment, each of the set of shotlist items 606A-D can have media content associated with that shotlist item. For example and in one embodiment, shotlist items 606C and 606D have one recorded video clip associated with them. While in one embodiment, the dynamic shotlist display 602 illustrates four shotlist items 606A-D, in alternate embodiments, the dynamic shotlist display 602 can have less or more shotlist items.

In one embodiment, the setup button 610 is used to present a user interface to view/edit the dynamic shotlist metadata (e.g., name, location, subject, etc.). In one embodiment, the create video button is used to proceed to the edit video user interface after all clips have been acquired. In one embodiment, the trash icon is used to delete a shotlist item 6060A-D.

Figure 7:
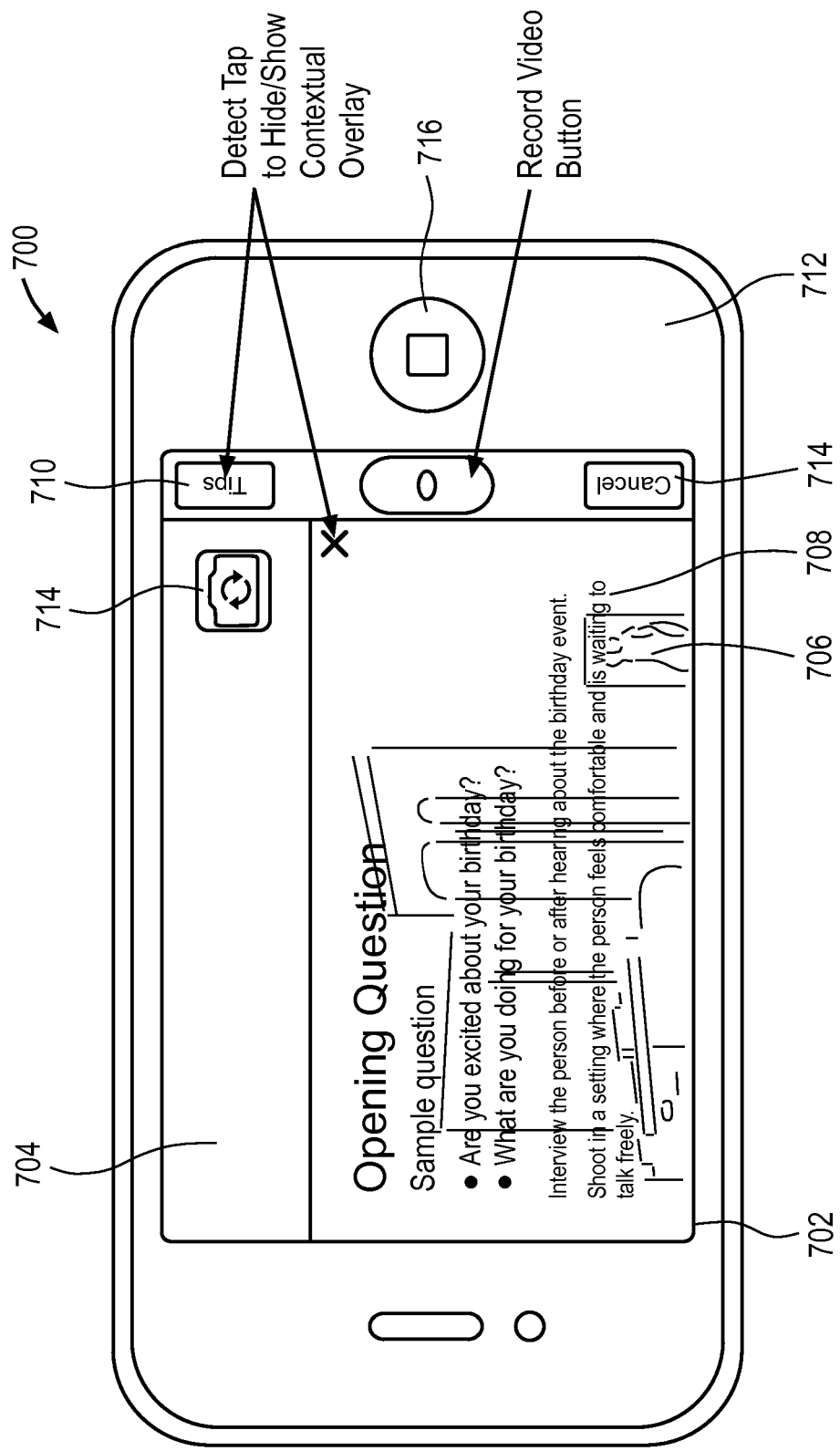
FIG. 7 is a block diagram of one embodiment of a semi-transparent contextual visual overlay in live camera mode.

FIG. 7 is a block diagram of one embodiment of a semi-transparent contextual visual overlay 706 in live camera mode. In FIG. 7, the portable multifunction device 700 is in live camera mode 702 that can be used to acquire a video clip. In one embodiment, in live camera mode 702, the portable multifunction 700 displays a user interface 704 that is used to preview a scene for video acquiring. In this embodiment, an overlay 706 is laid over the user interface 704 as a semi-transparent visual overlay, which allows the user to video the preview of the scene and observe the visual cues 708 that are part of the overlay 706. In one embodiment, the overlay 706 is displayed during the preview and/or recording of the shot and can guide the user through the shot acquisition process with contextual tips and/or instructions for that particular shot. The cues 708 can be in the textual, an illustration, animation, audio, video, etc., and/or a combination thereof). In one embodiment, the cues 708 are general (e.g., hold the device steady, etc.) and/or can be specific to the particularly type of activity that is being recorded. For example and in one embodiment, if the activity being recorded is personal interview for a birthday event, the cues 708 may include reminders on the length of the shot (e.g., "keep it short," "getting lengthy," "wrap it up", etc.).

In one embodiment, the cues can be dynamic and change during the video recording process. For example and in one embodiment, the cues can change as the length of the video clip recording increases (e.g., cue changes from "keep it short" to "getting lengthy" and to "wrap it up" as the video clip recording length increases). In addition, the video cues can include questions or notes the user can use while making the recording. For example and in one embodiment, for the "opening question" section of a birthday video type, sample questions could be "Are you excited about your birthday?" and "What are you doing for your birthday?". In addition, the cues can help plan the video clip recording. For the birthday example above, the cues indicate when to take the video clip (e.g., "interview the person before or at the beginning of the birthday event") and/or the location for the clip (e.g., "shoot in a setting where the person feels comfortable and is willing to talk freely").

In one embodiment, the live camera mode 702 can further include a toggle 712 to hide/display the overlay 706 and a record video button 716 to start/stop the recording of the video. In addition, the live camera mode 702 includes a cancel button 714 that can be used to cancel the recording of the video. In another embodiment, the overlay further includes a close icon 716 to hide the overlay 706.

Figure 8:
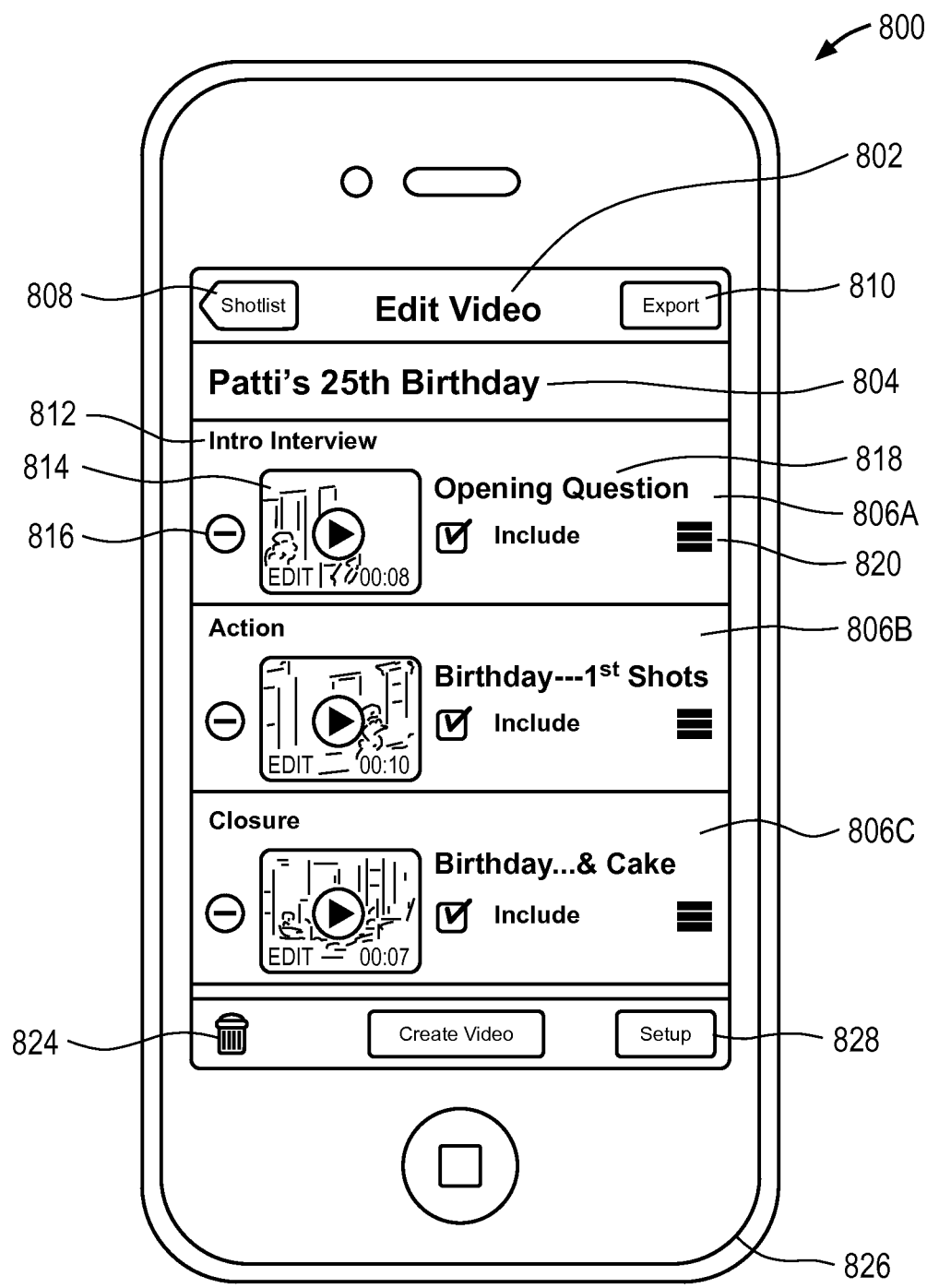
FIG. 8 is a block diagram of one embodiment of an edit video user interface displaying logic of an edit decision list.

FIG. 8 is a block diagram of one embodiment of an edit video user interface 802 for a portable multifunction device 800 displaying logic of an edit decision list. In FIG. 8, the edit video user interface 802 includes a title of the video production 804, sections 806A-C, shotlist button 808, export button 810, trash icon 824, render movie button 826, setup button 828. In one embodiment, each section 806A-C is a group of media clips such as video clips that relate to a specific activity of one of the set of pre-defined activities for that video project. For example and in one embodiment, a section 806A-C can be the lighting of the birthday cake for any birthday party video project. In one embodiment, each section 806A-C includes an activity label 812, video clip preview 814, delete button 816, section title 818, and rearrangement icon 820. The activity label 812 labels the activity (e.g., introduction interview, action, closure, etc.). The video clip preview 814 provides an opportunity for the user to preview the one or more video clips for that section (e.g. sliding a finger to move through the one or more video clips, etc.). The delete button 816 is used to delete the section from the edit decision list. The section label 818 is the name of the section. The rearrangement icon 820 allows a user to rearrange the order of clips and/or sections for the rendered video production.

In one embodiment, the shotlist button 808 can be used to navigate to the shotlist user interface as described in FIG. 6 above. The export button 810 can be used to export one or more of video clips to other applications and/or services. The trash icon 824 can be used to delete a section. The render movie button 826 can be used to render the video production using the edit decision list. The setup button 828 can be used to view/edit some or all of the metadata of the edit decision list.

Figure 9:
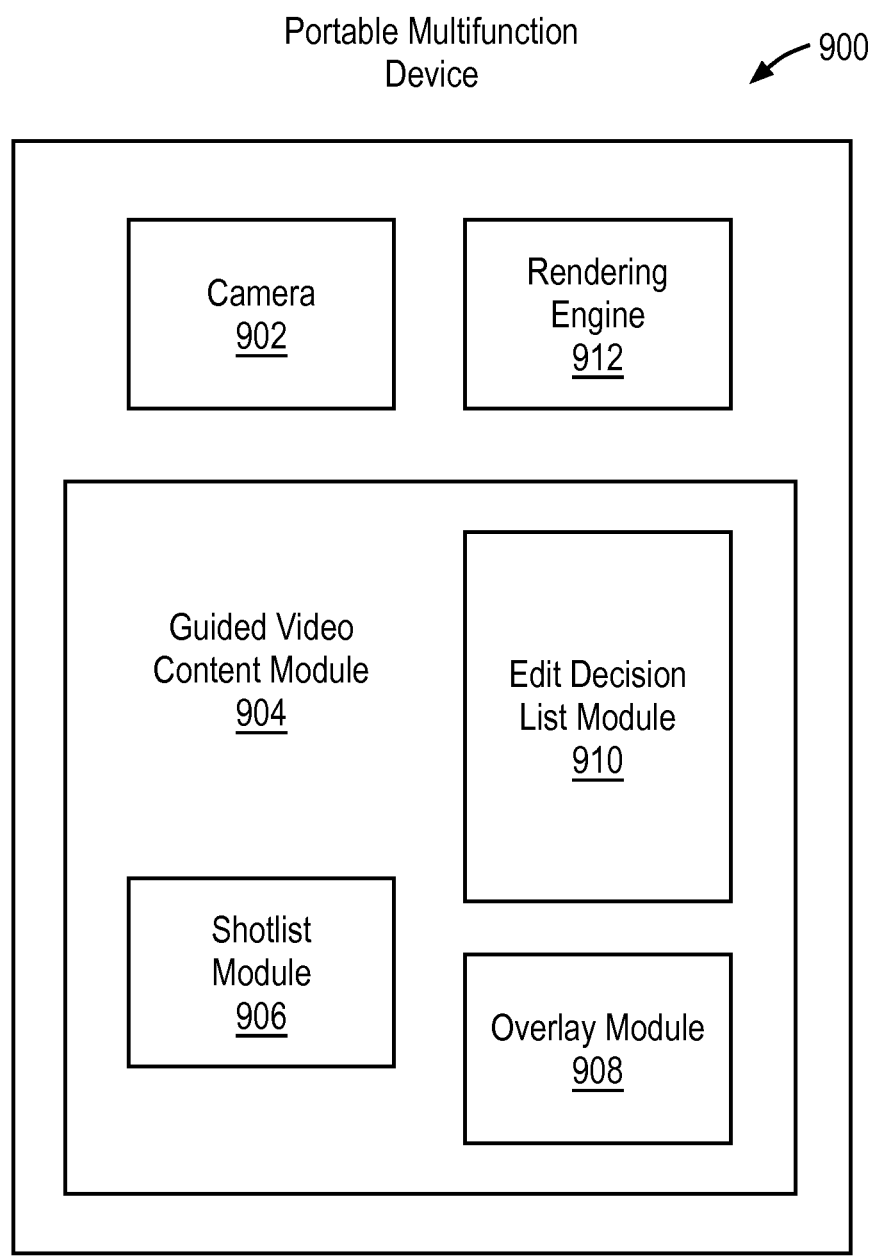
FIG. 9 is a block diagram of one embodiment of a portable multifunction device.

FIG. 9 is a block diagram of one embodiment of a portable multifunction device 900. In FIG. 9, the portable multifunction device 900 includes a camera 902, guided video content module 904, and rendering engine 912. In one embodiment, the camera 902 is a camera capable of acquiring video and/or still image content and in enclosed within the portable multifunction device 900. In another embodiment, the camera 902 is tethered to the portable multifunction device 900. In one embodiment, the guided video content module 904 guides the creation of video production as described in FIG. 1 above. In one embodiment, the rendering engine 912 renders the video production using the edit decision list.

In one embodiment, the guided video content module 904 includes shotlist module 906, overlay module 908, and edit decision list module 910. The shotlist module 906 acquires the video content using a dynamic shotlist as described in FIG. 2 above. The overlay module 908 acquires the video content for a video clip using a dynamic overlay as described in FIG. 3 above. The edit decision list module 910 edits the list of shots used to create the video content as described in FIG. 4 above.

Figure 10:
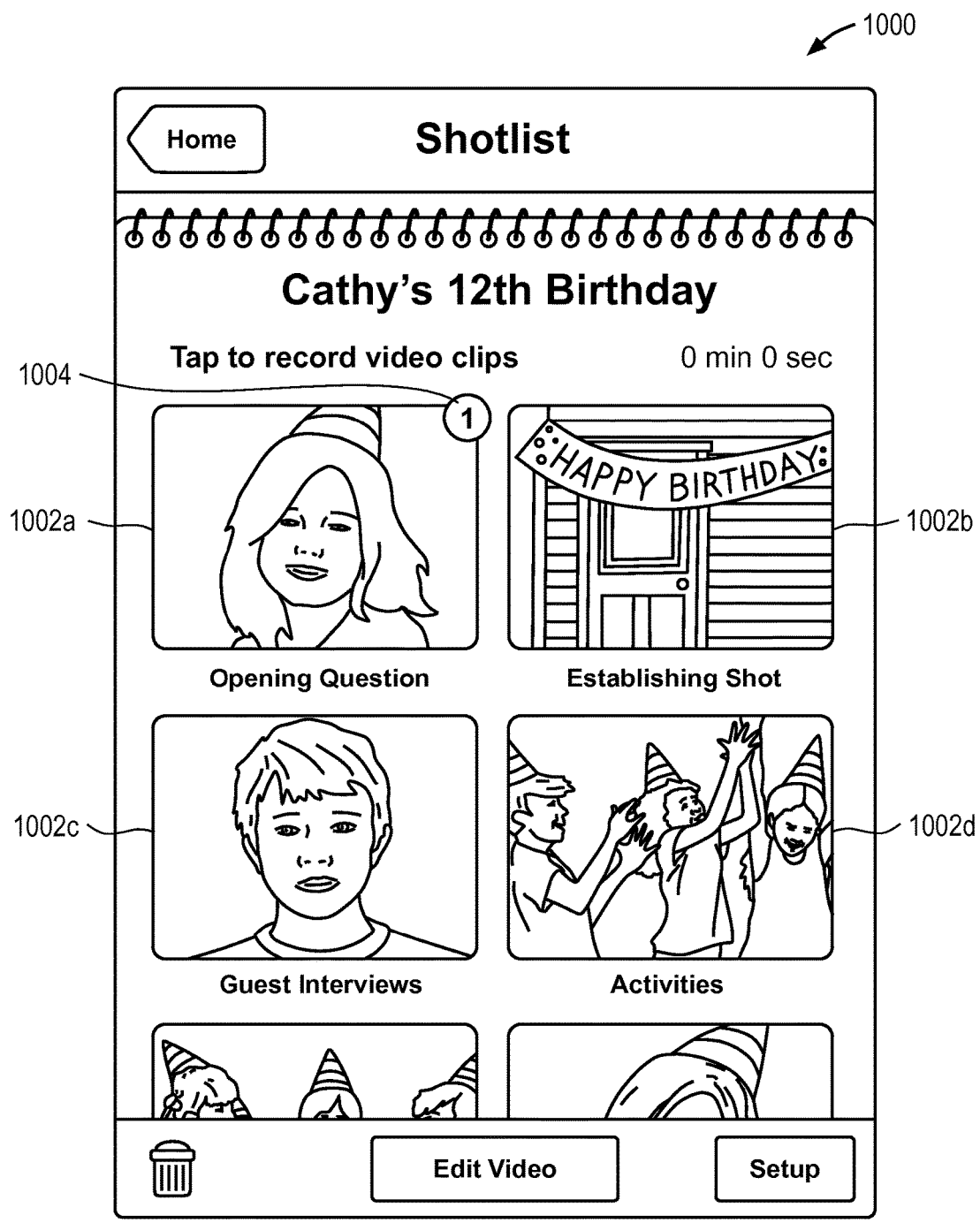
FIG. 10 is a block diagram of one embodiment of dynamic shotlist for a birthday party video production.

FIG. 10 is a block diagram of one embodiment of dynamic shotlist user interface 1000 for a birthday party video production. In FIG. 10, dynamic shotlist user interface 1000 comprises shotlist items 1002A-D. As described above, each of the shotlist items can correspond to one of the set of pre-defined activities that relate to the video production. For example and in one embodiment, dynamic shot list user interface 1000 includes shotlist items for an opening question 1002A, establishing shot 1002B, guest interviews 1002c, and activities 1002D. In addition, each of the shotlist items may have one or more video clips associated with that shotlist item. For example and in one embodiment, the opening question 1002A has one video clip 1004 associated with this shotlist item.

Figure 11:
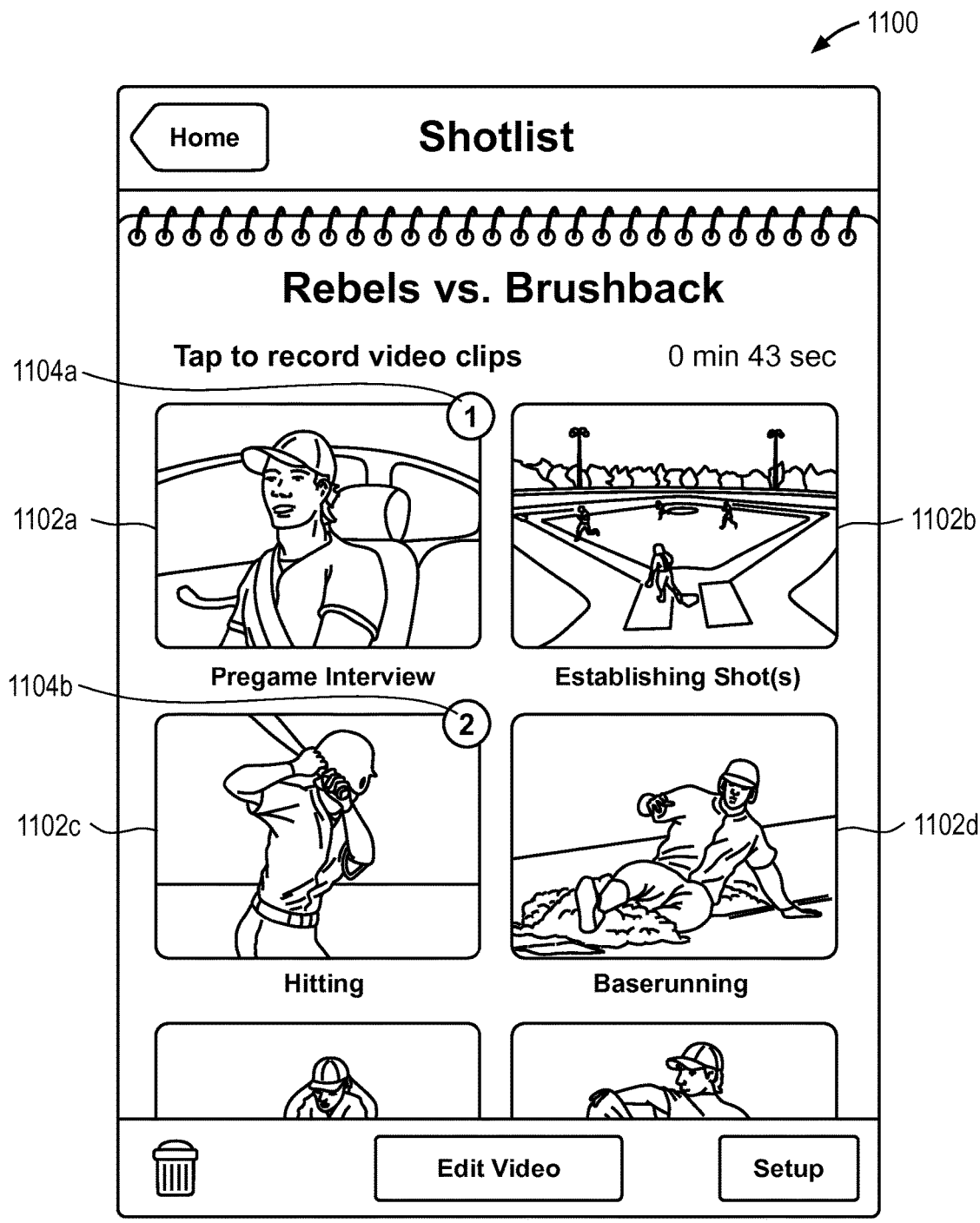
FIG. 11 is a block diagram of one embodiment of dynamic shotlist for a baseball game video production.

FIG. 11 is a block diagram of one embodiment of dynamic shotlist 1100 for a baseball game video production. In FIG. 11, dynamic shotlist user interface 1100 comprises shotlist items 1102A-D. As described above, each of the shotlist items can correspond to one of the set of pre-defined activities that relate to the video production. For example and in one embodiment, dynamic shot list user interface 1100 includes shotlist items for a pregame interview 1102A, establishing shot(s) 1102B, hitting 1102c, and base running 1102D. In addition, each of the shotlist items may have one or more video clips associated with that shotlist item. For example and in one embodiment, the pregame interview 1102A has one video clip 1104A associated with this shotlist item and the hitting shotlist item 1102C has two video clip associated with it.

Figure 12:
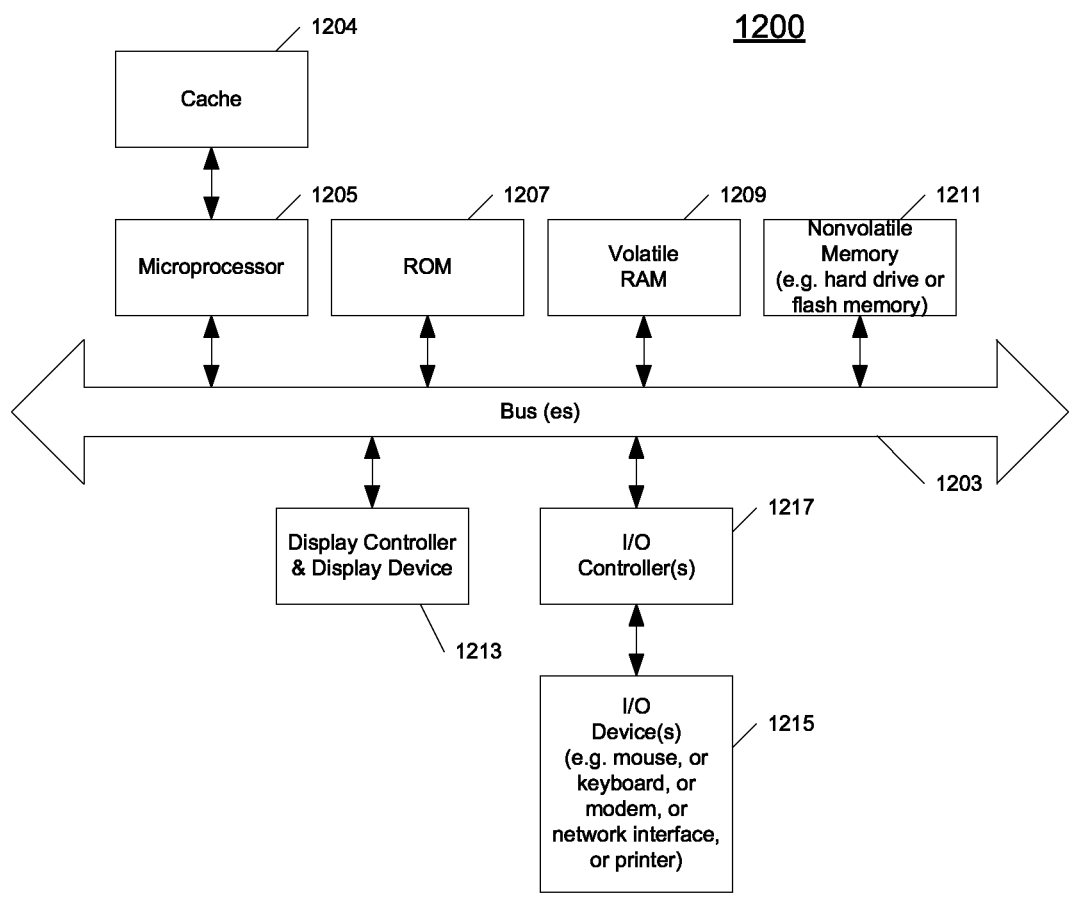
FIG. 12 illustrates one example of a typical computer system, which may be used in conjunction with the embodiments described herein.

FIG. 12 shows one example of a data processing system 1200, which may be used with one embodiment of the present invention. For example, the system 1200 may be implemented including a host as shown in FIG. 1. Note that while FIG. 12 illustrates various components of a computer system, it is not intended to represent any particular architecture or manner of interconnecting the components as such details are not germane to the present invention. It will also be appreciated that network computers and other data processing systems other consumer electronic devices which have fewer components or perhaps more components may also be used with the present invention.

As shown in FIG. 12, the computer system 1200, which is a form of a data processing system, includes a bus 1203 which is coupled to a microprocessor(s) 1205 and a ROM (Read Only Memory) 1207 and volatile RAM 1209 and a non-volatile memory 1211. The microprocessor 1205 may retrieve the instructions from the memories 1207, 1209, 1211 and execute the instructions to perform operations described above. The bus 1203 interconnects these various components together and also interconnects these components 1205, 1207, 1209, and 1211 to a display controller and display device 1213 and to peripheral devices such as input/output (I/O) devices which may be mice, keyboards, modems, network interfaces, printers and other devices which are well known in the art. Typically, the input/output devices 1215 are coupled to the system through input/output controllers 1217. The volatile RAM (Random Access Memory) 1209 is typically implemented as dynamic RAM (DRAM) which requires power continually in order to refresh or maintain the data in the memory.

The mass storage 1211 is typically a magnetic hard drive or a magnetic optical drive or an optical drive or a DVD RAM or a flash memory or other types of memory systems which maintain data (e.g. large amounts of data) even after power is removed from the system. Typically, the mass storage 1211 will also be a random access memory although this is not required. While FIG. 12 shows that the mass storage 1211 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1203 may include one or more buses connected to each other through various bridges, controllers and/or adapters as is well known in the art.

Figure 13:
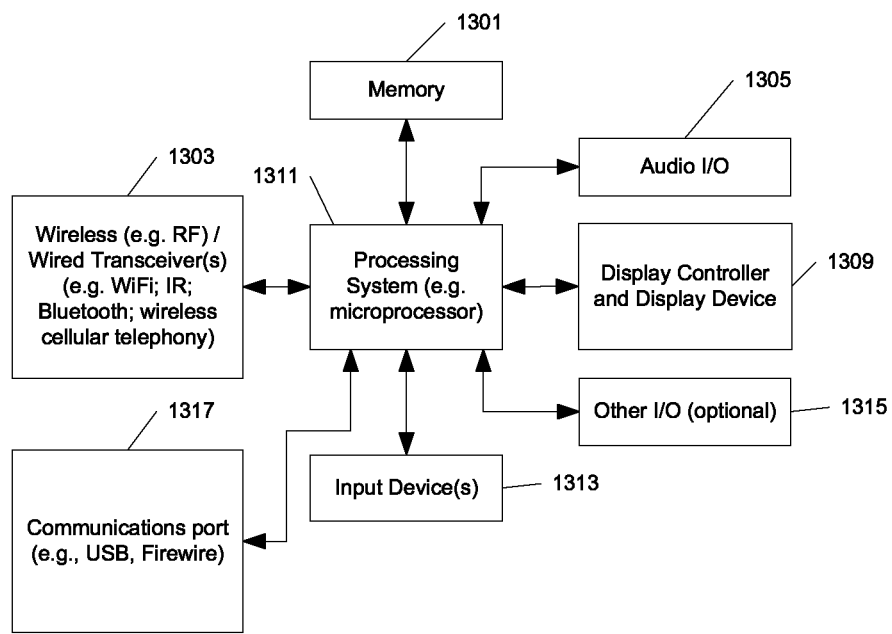
FIG. 13 shows an example of a data processing system, which may be used with one embodiment of the present invention.

FIG. 13 shows an example of another data processing system 1300 which may be used with one embodiment of the present invention. For example, system 1300 may be implemented as a portable multifunction device as shown in FIG. 1. The data processing system 1300 shown in FIG. 13 includes a processing system 1311, which may be one or more microprocessors, or which may be a system on a chip integrated circuit, and the system also includes memory 1301 for storing data and programs for execution by the processing system. The system 1300 also includes an audio input/output subsystem 1305, which may include a microphone and a speaker for, for example, playing back music or providing telephone functionality through the speaker and microphone.

A display controller and display device 1307 provide a visual user interface for the user; this digital interface may include a graphical user interface which is similar to that shown on a Macintosh computer when running OS X operating system software. The system 1300 also includes one or more wireless transceivers 1303 to communicate with another data processing system, such as the system 1300 of FIG. 13. A wireless transceiver may be a WLAN transceiver, an infrared transceiver, a Bluetooth transceiver, and/or a wireless cellular telephony transceiver. It will be appreciated that additional components, not shown, may also be part of the system 1300 in certain embodiments, and in certain embodiments fewer components than shown in FIG. 13 may also be used in a data processing system. The system 1300 further includes one or more communications ports 1317 to communicate with another data processing system, such as the system 1200 of FIG. 12. The communications port may be a USB port, Firewire port, Bluetooth interface, etc.

The data processing system 1300 also includes one or more input devices 1313, which are provided to allow a user to provide input to the system. These input devices may be a keypad or a keyboard or a touch panel or a multi touch panel. The data processing system 1300 also includes an optional input/output device 1315 which may be a connector for a dock. It will be appreciated that one or more buses, not shown, may be used to interconnect the various components as is well known in the art. The data processing system shown in FIG. 13 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1300 may be a network computer or an embedded processing device within another device, or other types of data processing systems, which have fewer components or perhaps more components than that shown in FIG. 13.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone (s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 14:
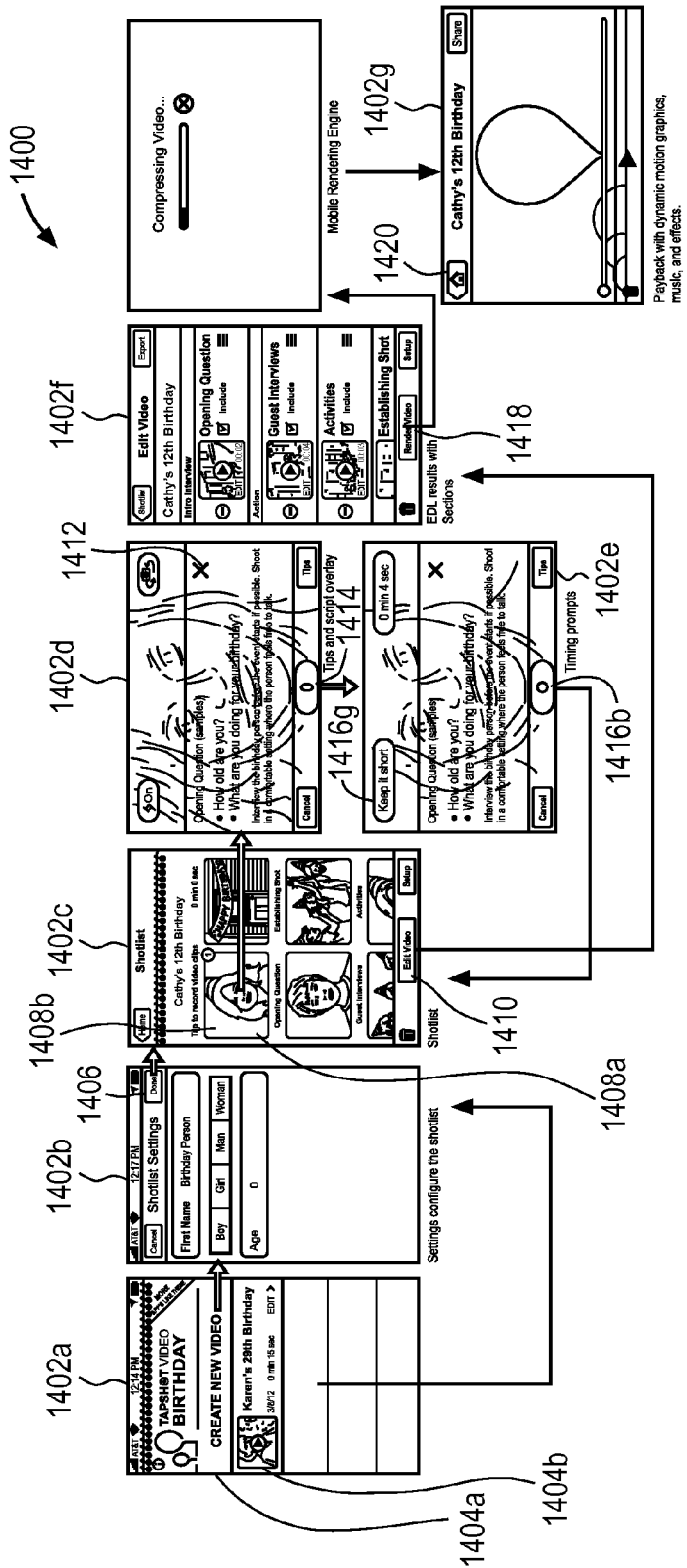
FIG. 14 is a block diagram of one embodiment of a flow of user interfaces for a birthday event video production.

FIG. 14 is a block diagram of one embodiment of a flow 1400 of user interfaces 1402A-G for a birthday event video production. In FIG. 14, the flow 1400 illustrates the interrelationship between the different user interfaces 1402A-G. In one embodiment, the home user interface 1402A includes a create new video button 1404A and a button that represents an existing birthday video production 1404B. In this embodiment, the create new video button 1402A is the create new video button as described in FIG. 5 above. In addition, the existing birthday video production button 1404B brings up the existing video production so that the user can review/edit to this video production.

In one embodiment, activation of the create new video button 1404A leads to the shotlist settings user interface 1402B. In one embodiment, the shotlist settings user interface 1402B allows the user to view/edit the metadata that is particular to the video type. For example and in one embodiment, for the birthday video type, the metadata the user can view/edit is the birthday person's name, gender, and age. Activation of the done button 1406 leads to the dynamic shotlist user interface 1402C.

In one embodiment, the dynamic shotlist user interface 1404C is the dynamic shotlist user interface as described above in FIGS. 6 and 10. In this embodiment, the dynamic shotlist user interface 1404C includes shotlist items 1408A, a video clip indication 1408B, and an edit video button 1410. In one embodiment, the shotlist items 1408A are the shotlist items as described above in FIGS. 6 and 10. In one embodiment, activation of one of the shotlist items puts the portable multifunction device into a live camera mode and overlays a video overlay as described in FIG. 7 above. In addition, the video clip indication 1408B indicates the number of video clips associated with the shotlist item. In one embodiment, activation of the edit video button leads to the edit decision list user interface 1402F.

In one embodiment, the semi-transparent contextual visual overlay 1402D in live camera mode is used to acquire a video clip and present cues that are used to guide this video clip acquisition as described above in FIG. 7. In one embodiment, the overlay 1412 includes cues that specific to the type of shotlist being recorded. In one embodiment, activation of the record button 1414 activates the recording of the video clip and can lead to changes in the cues as illustrated in semi-transparent contextual visual overlay 1402E. For example and in one embodiment, in semi-transparent contextual visual overlay 1402E, an additional visual cue 1416A reminds the user to "keep it short" is overlaid over the scene preview. Activation of the recording button 1416B stops the records and leads back to the dynamic shotlist user interface 1402C.

In one embodiment, activation of the edit video button 1410 of the dynamic shotlist user interface 1402C leads to the edit decision list user interface 1402F. In one embodiment, the edit decision list user interface 1402F is a user interface that allows a user to view/edit the edit decision list as described above in FIG. 8. Activation of the render video button 1418 leads to the video production preview user interface 1402G, where the user can preview the video production. Activation of the home button 1420 leads to the home user interface 1402A.

Figure 15:
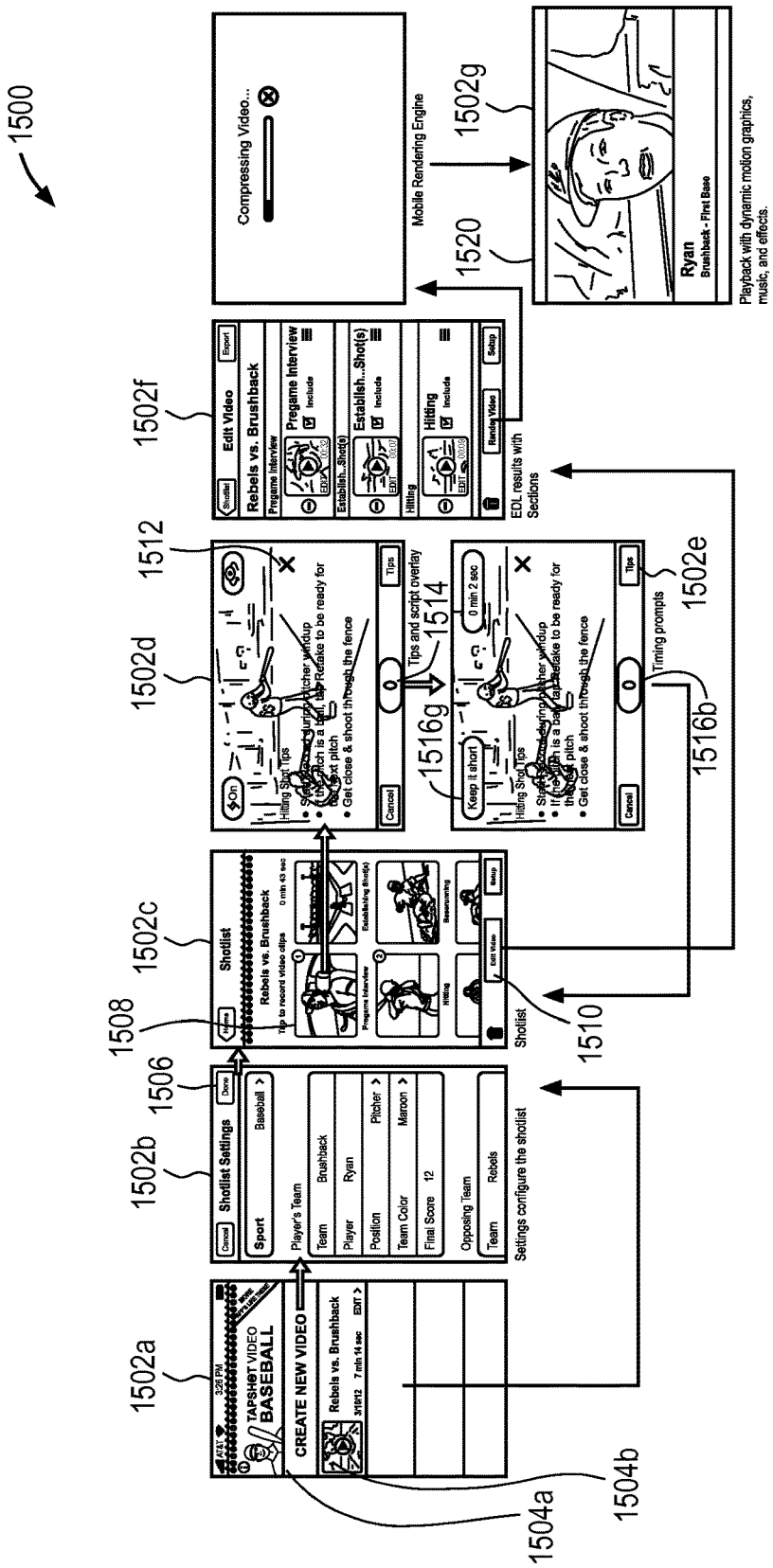
FIG. 15 is a block diagram of one embodiment of a flow of user interfaces for a baseball game video production.

FIG. 15 is a block diagram of one embodiment of a flow of user interfaces for a baseball game video production. In FIG. 15, the flow 1500 illustrates the interrelationship between the different user interfaces 1502A-G. In one embodiment, the home user interface 1502A includes a create new video button 1504A and a button that represents an existing baseball game video production 1504B. In this embodiment, the create new video button 1502A is the create new video button as described in FIG. 5 above. In addition, the existing baseball game video production button 1504B brings up the existing video production so that the user can review/edit to this video production.

In one embodiment, activation of the create new video button 1504A leads to the shotlist settings user interface 1502B. In one embodiment, the shotlist settings user interface 1502B allows the user to view/edit the metadata that is particular to the video type. For example and in one embodiment, for the baseball game video type, the metadata the user can view/edit is the sport, player's team name, position, team color, final score, and opposing team name. Activation of the done button 1506 leads to the dynamic shotlist user interface 1502C.

In one embodiment, the dynamic shotlist user interface 1504C is the dynamic shotlist user interface as described above in FIGS. 6 and 10. In this embodiment, the dynamic shotlist user interface 1504C includes shotlist items 1508A, a video clip indication 1508B, and an edit video button 1510. In one embodiment, the shotlist items 1508A are the shotlist items as described above in FIGS. 6 and 10. In one embodiment, activation of one of the shotlist items puts the portable multifunction device into a live camera mode and overlays a video overlay as described in FIG. 7 above. In addition, the video clip indication 1508B indicates the number of video clips associated with the shotlist item. In one embodiment, activation of the export video button leads to the export decision list user interface 1502F.

In one embodiment, the semi-transparent contextual visual overlay 1502D in live camera mode is used to acquire a video clip and present cues that are used to guide this video clip acquisition as described above in FIG. 7. In one embodiment, the overlay 1512 includes cues that specific to the type of shotlist being recorded. In one embodiment, activation of the record button 1514 activates the recording of the video clip and can lead to changes in the cues as illustrated in semi-transparent contextual visual overlay 1502E. For example and in one embodiment, in semi-transparent contextual visual overlay 1502E, an additional visual cue 1516A reminds the user to "keep it short" is overlaid over the scene preview. Activation of the recording button 1516B stops the records and leads back to the dynamic shotlist user interface 1502C.

In one embodiment, activation of the edit video button 1510 of the dynamic shotlist user interface 1502C leads to the edit decision list user interface 1502F. In one embodiment, the edit decision list user interface 1502F is a user interface that allows a user to view/edit the edit decision list as described above in FIG. 8. Activation of the render video button 1518 leads to the video production preview user interface 1502G, where the user can preview the video production. Activation of the home button 1420 leads to the home user interface 1502A.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "configuring," "communicating," "rendering," "sharing," "detecting," "associating," "acquiring," "selecting," "receiving," "retrieving," "storing," "displaying," 'coupling," "updating," "transmitting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to guide creation of video content, the method comprising:
    retrieving a shotlist for the video content, wherein the shotlist is a list of a plurality of recommended shots for a type of the video content;
    acquiring a plurality of video clips for two or more of the plurality of recommended shots, wherein a semi-transparent dynamic overlay is presented during the acquisition of one of the plurality of video clips that gives visual cues to guide a shot acquisition for this video clip and one of the visual cues includes a plurality of instructions for the acquisition of the one of the plurality of video clips that change automatically during the acquisition of the one of the plurality of video clips, a first instruction of the plurality of instructions is a question for an interview between an operator of the shot acquisition and a subject of the one of the plurality of video clips, and a second instruction of the plurality of instructions includes a reminder about the length of the shot acquisition; and
    assembling the video content using the shotlist and the plurality of video clips.

2. The non-transitory machine-readable medium of claim 1, wherein one of the plurality of recommended shots is associated with one or more video clips.

3. The non-transitory machine-readable medium of claim 1, wherein a recommended shot is one of a set of pre-defined activities that relate to the type of the video content.

4. The non-transitory machine-readable medium of claim 1, wherein the type of the video content is corresponds to a set of pre-defined activities.

5. The non-transitory machine-readable medium of claim 1, wherein the type of the video content is selected from a group consisting of an event and an activity.

6. The non-transitory machine-readable medium of claim 1, wherein the method further comprises:
    storing shot metadata for each of the recommended shots.

7. The non-transitory machine-readable medium of claim 1, wherein the shot metadata is selected from the group consisting of suggested camera shot information, label, thumbnail, number of clips, and assigned section.

8. The non-transitory machine-readable medium of claim 1, wherein the method further comprises:
    acquiring the plurality of video clips.

9. The non-transitory machine-readable medium of claim 1, wherein the visual cues further include an audio cue.

10. The non-transitory machine-readable medium of claim 1, wherein the plurality of video clips are related to a single event involving the subject and the visual cues further include an indication for when during the single event to acquire another one of the plurality of video clips.

11. A computerized method to guide creation of video content, comprising:
    detecting a selection of a respective one of a plurality of items in a shotlist, wherein the shotlist is a list of a plurality of recommended shots for a type of the video content; and
    in response to the respective item selection,
        storing structured metadata about the item selection,
        opening a video camera,
        presenting a dynamic overlay, wherein the dynamic overlay presents visual cues to guide a shot acquisition for a video clip and the dynamic overlay is a semi-transparent overlay presented during an acquisition of video content for the respective item in the shotlist and the visual cues include a plurality of instructions for the acquisition of the one of the plurality of video clips that change automatically during the acquisition of the one of the plurality of video clips, and a first instruction of the plurality of instructions is a question for an interview between an operator of the shot acquisition and a subject of one of the video clip, and a second instruction of the plurality of instructions includes a reminder about the length of the shot acquisition; and
        receiving a command to save a recorded clip of the video content,
        storing additional metadata for the video content, and
        updating the respective item in the shotlist.

12. The computerized method of claim 11, wherein each of the plurality of items corresponds to a different one of a plurality of recommended shots for a type of the video content.

13. The computerized method of claim 12, wherein one of the plurality of recommended shots is associated with one or more video clips.

14. The computerized method of claim 12, wherein a recommended shot is one of the set of pre-defined activities that relate to the type of the video content.

15. The computerized method of claim 12, wherein the type of the video content is corresponds to a set of pre-defined activities.

16. The computerized method of claim 11, wherein each of the plurality of items is an icon.

17. The computerized method of claim 16, further comprising:
    presenting the plurality of items.

18. The computerized method of claim 11, wherein in the response to the respective item selection, the method further comprises:

detecting contact with the dynamic overlay button, the dynamic video overlay configured to toggle visibility.

19. The computerized method of claim 18, wherein the visual cues is selected from a group consisting of contextual tips for the shot acquisition, instructions for the shot acquisition, and subject interview instructions.

20. The computerized method of claim 18, wherein contents of the dynamic overlay can change during the acquisition of the video content.

21. The method of claim 11, wherein the plurality of video clips are related to a single event involving the subject and the visual cues further include an indication for where during the single event to acquire another one of the plurality of video clips.

22. A device to create video content, the device comprising:
 a camera;
 a processor;
 a memory coupled to the processor though a bus; and
 a process executed from the memory by the processor to cause the processor to retrieve a shotlist for the video content, wherein the shotlist is a list of a plurality of recommended shots for a type of the video content, acquiring a plurality of video clips for two or more of the plurality of recommended shots, wherein a semi-transparent dynamic overlay is presented during the acquisition of one of the plurality of video clips that gives visual cues to guide a shot acquisition for a video clip, one of the visual cues includes a plurality of instructions for the acquisition of the one of the plurality of video clips that change automatically during the acquisition of the one of the plurality of video clips, and a first instruction of the plurality of an instructions is a question for an interview between an operator of the shot acquisition and a subject of the one of the plurality of video clips, a second instruction of the plurality of instructions includes a reminder about the length of the shot acquisition, and assemble the video content using the shotlist and the plurality of video clips.

23. The device of claim 22, wherein one of the plurality of recommended shots is associated with one or more video clips.

* * * * *